US008856518B2

(12) United States Patent (10) Patent No.: US 8,856,518 B2
Sridharan et al. (45) Date of Patent: Oct. 7, 2014

(54) SECURE AND EFFICIENT OFFLOADING OF NETWORK POLICIES TO NETWORK INTERFACE CARDS

(75) Inventors: Murari Sridharan, Sammamish, WA (US); Narasimhan Venkataramaiah, Redmond, WA (US); Yu-Shun Wang, Bellevue, WA (US); Albert G. Greenberg, Seattle, WA (US); Alireza Dabagh, Kirkland, WA (US); Pankaj Garg, Seattle, WA (US); Daniel M. Firestone, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 133 days.

(21) Appl. No.: 13/565,369

(22) Filed: Aug. 2, 2012

(65) Prior Publication Data
US 2013/0061047 A1 Mar. 7, 2013

Related U.S. Application Data

(60) Provisional application No. 61/532,002, filed on Sep. 7, 2011, provisional application No. 61/593,772, filed on Feb. 1, 2012.

(51) Int. Cl.
*H04L 29/06* (2006.01)
*H04L 12/713* (2013.01)

(52) U.S. Cl.
CPC .................................. *H04L 45/586* (2013.01)
USPC ........................................................ 713/162

(58) Field of Classification Search
USPC ........................................................ 713/162
See application file for complete search history.

(56) References Cited

U.S. PATENT DOCUMENTS

| | | | |
|---|---|---|---|
| 6,345,347 B1* | 2/2002 | Biran | 711/163 |
| 8,621,627 B1* | 12/2013 | Eiriksson et al. | 726/23 |
| 2007/0174850 A1* | 7/2007 | El Zur | 719/321 |
| 2008/0263258 A1 | 10/2008 | Allwell et al. | |
| 2008/0271134 A1* | 10/2008 | Johnson et al. | 726/13 |
| 2009/0154708 A1* | 6/2009 | Kolar Sunder et al. | 380/279 |
| 2009/0185500 A1 | 7/2009 | Mower et al. | |
| 2010/0107162 A1* | 4/2010 | Edwards et al. | 718/1 |
| 2010/0169536 A1* | 7/2010 | Shedel et al. | 711/6 |

(Continued)

OTHER PUBLICATIONS

Ram et al., "sNICh: Efficient Last Hop Networking in the Data Center", Oct. 21, 2010, ANCS, pp. 1-12.*

(Continued)

*Primary Examiner* — Michael S McNally
(74) *Attorney, Agent, or Firm* — John Jardine; Katherine Drakos; Micky Minas

(57) ABSTRACT

Techniques for efficient and secure implementation of network policies in a network interface controller (NIC) in a host computing device operating a virtualized computing environment. In some embodiments, the NIC may process and forward packets directly to their destinations, bypassing a parent partition of the host computing device. In particular, in some embodiments, the NIC may store network policy information to process and forward packets directly to a virtual machine (VM). If the NIC is unable to process a packet, then the NIC may forward the packet to the parent partition. In some embodiments, the NIC may use an encapsulation protocol to transmit address information in packet headers. In some embodiments, this address information may be communicated by the MC to the parent partition via a secure channel. The NIC may also obtain, and decrypt, encrypted addresses from the VMs for routing packets, bypassing the parent partition.

23 Claims, 16 Drawing Sheets

(56) References Cited

U.S. PATENT DOCUMENTS

| | | | |
|---|---|---|---|
| 2010/0257263 A1 | 10/2010 | Casado et al. | |
| 2010/0333189 A1* | 12/2010 | Droux et al. | 726/13 |
| 2011/0023031 A1 | 1/2011 | Bonola et al. | |
| 2011/0035494 A1* | 2/2011 | Pandey et al. | 709/224 |
| 2011/0090911 A1 | 4/2011 | Hao et al. | |
| 2011/0126197 A1 | 5/2011 | Larsen et al. | |
| 2011/0185063 A1 | 7/2011 | Head et al. | |

OTHER PUBLICATIONS

Kanada et al. "Address-Translation-Based Network Virtualization", In Proceedings of 10$^{th}$ International Conference on Networks, Jan. 2011, 6 pages.

Greenberg et al. "The Cost of a Cloud Research Problems in Data Center Networks", In Proceedings of ACM SIGCOMM Computer Communication Review, vol. 39, Issue 1, Jan. 2009, 6 pages.

\* cited by examiner

SECURE AND EFFICIENT OFFLOADING OF NETWORK POLICIES TO NETWORK INTERFACE CARDS

RELATED APPLICATIONS

This application claims priority under 35 U.S.C. §119(e) to U.S. Provisional Application Ser. No. 61/532,002, entitled "A SCALABLE AND FLEXIBLE DATA CENTER NETWORK USING GENERIC ROUTING ENCAPSULATION," filed on Sep. 7, 2011, and U.S. Provisional Application Ser. No. 61/593,772, entitled "GRE OFFLOAD FOR SR-IOV NICS," filed on Feb. 1, 2012, which are herein incorporated by reference in their entirety.

BACKGROUND

Virtualized computing is a technique for creating multiple virtual machines on a single physical computing device. This is often achieved by dividing the software and memory of the computing device into multiple logical partitions, each of which can host an operating system for a virtual machine. One of the partitions is often designated as a parent, or root, partition that delegates access to physical hardware and services to the virtual machines.

In some scenarios, virtual networks may be established between virtual machines residing in computing devices on a physical network. For example, data centers consisting of multiple physical servers can provide virtual local area networks (VLANs) to enterprises, such as corporations and other organizations. Such VLANs are often designed to provide a secure and isolated (with respect to reachability) environment in which to interconnect computers and share resources within an enterprise.

A virtual machine can communicate with other virtual machines or physical devices by accessing the host computer's hardware components, at the discretion of the parent partition. Network interface controllers (NICs) are components that allow a computing device to interface and communicate with a physical network. The NIC includes basic circuitry for implementing a communication protocol, such as Ethernet or Internet Protocol, and also includes limited memory for storing a network address associated with the communication protocol, such as a Medium Access Control (MAC) or IP address.

Each virtual machine can be assigned a network address, which can be a virtual address corresponding to a virtual network associated with the virtual machine. Routing data can be achieved by translating a virtual address, recognized by virtual machines communicating over a virtual network, to a physical address, recognized by hardware components that communicate over a physical network. This address translation can be performed by the parent partition, which is responsible for routing data traffic to and from the appropriate virtual machine within the host computing device. In addition, the parent partition can be responsible for implementing other network policies, such as access control and authorization, for the virtual machines on a host device.

Security is often a concern in virtualized computing environments. A host computing device often restricts access to hardware and networking information to only the parent partition. This centralized authority prevents virtual machines from potentially interfering with each other, whether accidentally or maliciously. As such, a tenant that has virtual machine hosted by a computing device can be granted a certain level of security and isolation from other tenants using the same hosting device.

SUMMARY

In one embodiment, there is provided a network interface controller adapted for use as part of a computing device operating a virtualized computing environment comprising a parent partition and at least one virtual machine. The network interface controller comprises a memory containing a data structure, and a processor adapted for forwarding a received packet. The forwarding comprises determining address information associated with the packet and determining, based at least in part on the address information, whether mapping information to forward the packet to a destination is present in the data structure. If the mapping information is present in the data structure, then the mapping information is used to send the packet to the destination. If the mapping information is not present in the data structure, then the packet is sent to the parent partition.

In another embodiment, there is provided a network interface controller adapted for use as part of a computing device operating a virtualized computing environment comprising a parent partition and at least one virtual machine. The network interface controller comprises a processor adapted for forwarding a received packet. The forwarding comprises receiving a packet and performing at least part of virtualized address processing of the packet. The packet is forwarded based at least in part on a result of the virtualized address processing.

In a further embodiment, there is provided a network interface controller adapted for use as part of a computing device operating a virtualized computing environment comprising a parent partition and at least one virtual machine. The network interface controller comprises a processor and at least one computer storage medium containing instructions that, when executed by the processor, perform a method. The method comprises receiving from the at least one virtual machine a packet and encrypted address information and decrypting the encrypted address information. The method further comprises encapsulating the packet by inserting the decrypted address information into a header of the packet and sending the encapsulated packet to an external network.

In a further embodiment, there is provided a method of operating a computing device to implement a virtualized computing environment comprising a parent partition and at least one virtual machine. The method comprises the virtual machine requesting address information from the parent partition. The method also comprises the parent partition encrypting the requested address information and sending the encrypted address information to the virtual machine. Furthermore, the method comprises the virtual machine sending a packet with the encrypted address information to a network interface controller of the computing device.

In a further embodiment, there is provided a method of operating a computing device to implement a virtualized computing environment comprising a parent partition and at least one virtual machine. The method comprises the virtual machine determining mapping information that satisfies a criteria and requesting the parent partition to send to a network interface controller the mapping information that satisfies the criteria. The method further comprises the parent partition sending the requested mapping information to the network interface controller.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
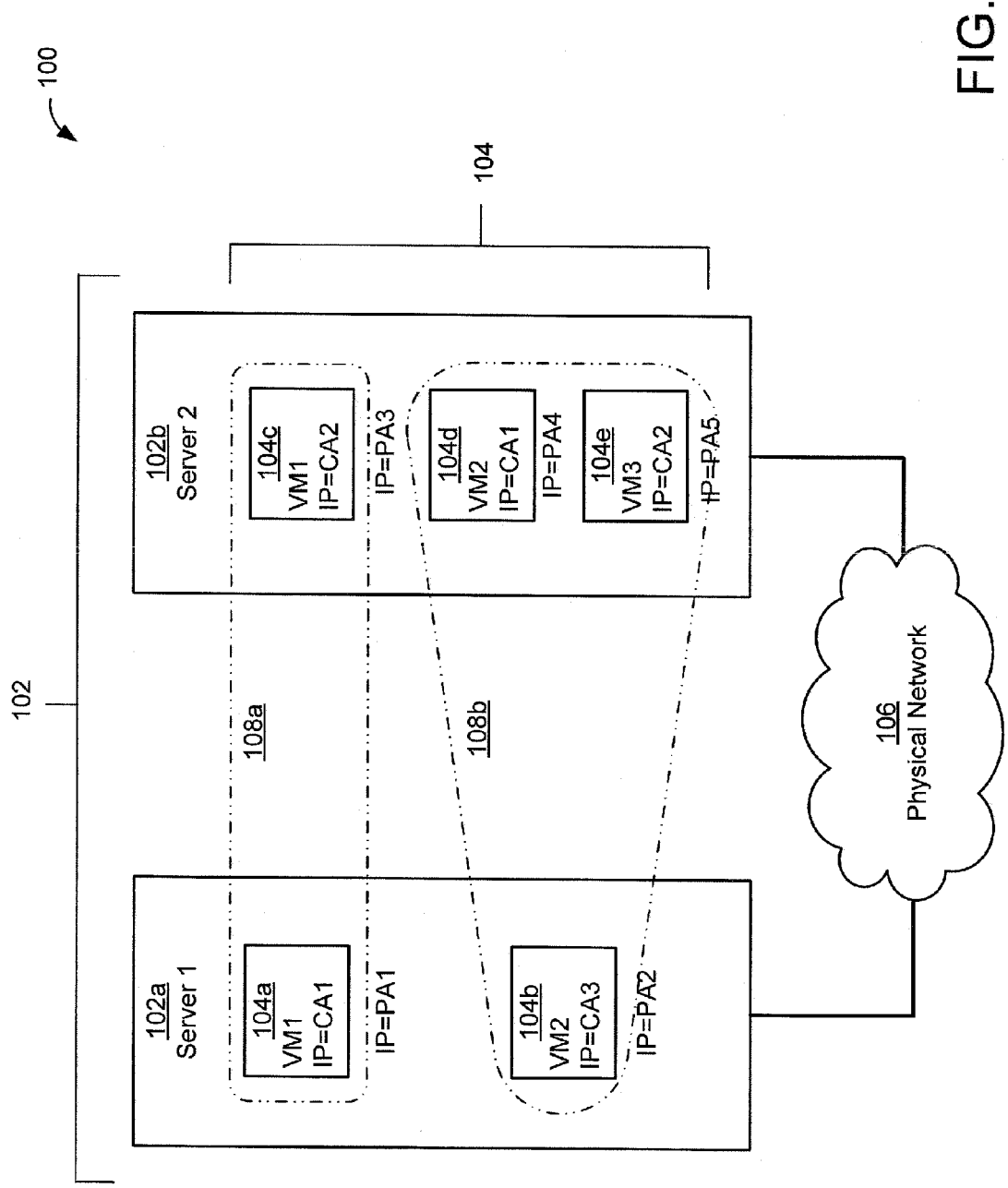
FIG. 1 is a sketch of an exemplary computing system in which some embodiments may operate.

Conventional virtualized computing environments rely on the parent partition to administer and implement network policies in a host machine. Incoming and outgoing network traffic may be processed on a packet-by-packet level by the software stack of the parent partition. This processing of network policies in the parent partition consumes CPU cycles and often introduces latency in the data flow. Furthermore, conventional forms of virtual networks may lack flexibility for dynamic allocation and consolidation of capacity. For example, in VLANs, the number of subnets is often limited and re-arranging subnets can be a challenge.

The inventors have recognized and appreciated that improvements in the efficiency of virtualized computing can be achieved by implementing network policies directly in the NIC hardware. In some embodiments, the NIC may be enabled to directly communicate with the virtual machines in a host computer, and may transmit and receive packets directly to and from the VMs, bypassing the parent partition. Enabling a NIC to perform a network policy that would otherwise have been performed by the parent partition will herein be referred to as "offloading" the network policy to the NIC, whether or not information is actually transferred from the parent partition to the NIC.

The inventors have recognized and appreciated that various data structures and/or processing instructions may be offloaded to the NIC, including but not limited to, mapping tables for address translation, access control lists for secure authorization, and encapsulation/decapsulation of packets. Regardless of the specific network policy or data structure that has been offloaded to the NIC, the offloaded information and processing may be used by the NIC to directly process and forward network traffic. In general, any suitable network policy, or combination of network policies, may be offloaded to the NIC for direct processing and forwarding of packets to their appropriate destinations.

The inventors have further recognized and appreciated that, because memory and processing capacity is often limited in a NIC used as part of a computing device, only a limited number of network policies may be offloaded to the NIC. In some embodiments, if the NIC is unable to process and forward a packet based on the network policies that it has been enabled to perform, then it may forward the packet to the parent partition, for further processing and forwarding to the appropriate destination.

The inventors have recognized and appreciated that limited resources of the NIC can be better utilized by intelligently offloading network policies to the NIC. In some embodiments, the most important or frequently-used network policies or rules may be offloaded to the NIC, while the less frequently-occurring policies may be handled by the parent partition. Alternatively or additionally, within a given network policy, the NIC may be enabled to process the most frequent traffic patterns, while other traffic may be processed by the parent partition. In general, any criteria may be used to determine which policies and network traffic to process in the NIC.

The offloaded mapping information may include address information not only in the local interface but also for remote hosts to which connections may be established. Exposing the mapping information to a VM for use in network input/output may post a security risk. For example, exposing the locations of other VMs in the same tenant could help a malicious VM to generate traffic that is intentionally non-random and unbalanced. In a multi-tenant environment, this may lead to disruptions, such as denial-of-service (DOS) attacks, on the network.

The inventors have further recognized and appreciated that security in a virtualized computing environment can be maintained while offloading network policies to the NIC. In some embodiments, network information, such as address information, may be communicated between the NIC and the parent partition using a secure channel. Alternatively or additionally, encrypted network information may be communicated to, or stored in, the virtual machines, which may not have authorization to decrypt the information.

The inventors have also recognized and appreciated that packet encapsulation can be used as a method for tenant address virtualization. In particular, the inventors have recognized and appreciated that further improvements in the efficiency of virtualized computing can be achieved by a policy-based, software-controlled network virtualization to support multi-tenancy using a packet encapsulation protocol. In some embodiments, the encapsulation and decapsulation operations may be performed directly in the NIC. In these embodiments, the parent partition may not be required to perform address-lookup and addition/removal of encapsulation headers for packets communicated to and from the virtual machines in the host. This may preserve CPU cycles and avoid additional latency in the data flow.

In some embodiments, packets may be encapsulated with a header that contains information identifying a virtual network. In some embodiments, the NIC may performing mapping and encapsulation of the tenant IP address to an IP address in provider address space. As such, this may allow access to tenant routing information directly from the packet header, directly accessible by the NIC. The inventors have recognized and appreciated that this may improve the efficiency of address translation and also allow flexible and dynamic allocation of services to servers in network.

The inventors have recognized and appreciated, however, that techniques for offloading network policies to the NIC may be used regardless of whether packets are encapsulated with virtual network information. In general, NICs may be enabled to perform processing and storage related to network policies that use any other suitable implementation of network virtualization, such as using address-rewrite to forward packets.

In view of the foregoing, described herein are techniques for offloading network policies to a NIC that is able to directly communicate with virtual machines in a virtualized networking environment.

In some embodiments, a NIC may be enabled to implement network policies that may otherwise have been implemented in the software stack of the parent partition. For example, a NIC may have stored in local memory network policy information, such as an mapping table or access control list, with which to process and forward network traffic directly to the appropriate destinations. Such network traffic may bypass software processing in the parent partition, and instead flow directly through a faster processing path in the NIC. In some embodiments, if the NIC is, for whatever reason, unable to process a particular packet, then it may forward that packet the parent partition for further processing and forwarding.

In some embodiments, a NIC can be enabled to communicate directly with virtual machines, bypassing the parent partition. For example, it is known to use the Single-Root Input-Output Virtualization (SR-MY) protocol ("Single-Root Virtualization I/O and Sharing Specification," Revision 1.0, PCI-SIG, 2007) to partition the hardware resources on a MC into one or more virtual interfaces, each dedicated to a virtual machine. Thus, the virtual machine has a dedicated and virtual port through which to communicate information to other virtual machines or devices.

In some embodiments, network policies and information may be offloaded from the parent partition without compromising the security and integrity of the network infrastructure. In some embodiments, network policy information may be communicated between the NIC and the parent partition via a separate and secure channel, for example, using out-of-band (OOB) data, as is known in the art. In some embodiments, the VMs may provide encrypted addresses to the NIC, but may not have a decryption key to decrypt those addresses.

In some embodiments, routing information may be transmitted together with the packet in an encapsulation header of the packet. For example, a logical network identifier, such as a tenant ID or a Virtual Subnet ID, may be directly placed in a field of a header. In some embodiments, the tenant ID or the Virtual Subnet ID may be accessible directly by a MC that can encapsulate or decapsulate packets, without the NIC having to store a lookup table that maps source-destination addresses to tenant IDs or Viruual Subnet IDs.

For example, it is known to use the Generic Routing Encapsulation (GRE) to encapsulate packets for transmission over networks of different types. If packets are encapsulated with the GRE protocol, then the tenant ID or the Virtual Subnet ID may be contained in the "key" field of the GRE header. The inventors have also recognized and appreciated that the NIC may use GRE to directly perform encapsulation and decapsulation of packets, bypassing the parent partition. This offloading of encapsulation and decapsulation operations to the NIC may allow the NIC to retrieve routing information from packet headers, without having to forward traffic to a software agent in the parent partition.

In some embodiments, the NIC may perform this encapsulation and decapsulation in conjunction with other network policy processing, such as address translation and access control authorization. The inventors have recognized and appreciated, however, that various combinations of offloading policies may be used, depending on the available memory and processing capacity on the NIC.

It should be appreciated, however, that the invention is not necessarily limited to using encapsulation for implementing network virtualization. The NIC may be enabled to process and store information related to network policies regardless of whether encapsulation is used. In general, network policies may be offloaded to the NIC in a virtualized computing environment implemented according to any suitable technique, such as using address-rewrite to forward packets to appropriate virtual machines.

FIG. 1 illustrates an example of a computer system in which embodiments of virtualized computing environments may operate. It should be appreciated, however, that the invention is not limited to operating in environments as in the example of FIG. 1, and generally may operate in any suitable virtualized computing environment.

In FIG. 1, a computer system 100 includes computing devices 102 that may operate virtualized computing environments. Two exemplary computing devices, 102a and 102b, are illustrated in FIG. 1. Exemplary computing devices may be, for example, servers that host services and data, such as in a datacenter or corporate network. It should be appreciated, however, that the exact number and nature of computing devices 102 is not critical to the invention, and any suitable hosts of virtualized computing environments may be used.

The computing devices 102 may host one or more virtual machines (VMs) 104. In FIG. 1, computing device 102a is shown with two exemplary virtual machines, 104a and 104b, while computing device 102b is shown with three exemplary virtual machines, 104c, 104d, and 104e. Virtual machines may be, for example, logical partitions of software and services that securely segregate tenants hosted on the computing devices 102, as is known in the art. It should be appreciated, however, that any suitable number of VMs may be implemented, and the invention is not limited to any particular technique or purpose for implementing VMs on a host computing device.

The computing devices 102 may be interconnected by a network, such as network 106. The network 106 may be a physical network fabric that uses a communication protocol to interconnect computing devices 102. For example, the network 106 may be a layer-3 Internet Protocol (IP) network, or a layer-2 Ethernet network. The exact protocol used in communication network 106 is not critical to the invention, however, and any suitable physical network fabric may be used to transport data between computing devices 102a and 102b.

In some embodiments, the virtual machines 104 may be assigned addresses, such as address PA1-PA5, on the physical network 106. Such addresses may be provider addresses (PA) which may be used by a network provider, for example, to route or switch data on the physical network 106. In FIG. 1, exemplary virtual machines 104a-104e are shown with provider addresses PA1-PA5, respectively, which may be IP addresses in network 106. However, it should be appreciated that addresses corresponding to any suitable communication protocol may be used to route data over the physical network fabric 106.

In some embodiments, the virtual machines 104 may also have a second set of addresses that identifies them as part of one or more virtual networks. These second addresses may be customer addresses used by a tenant to identify virtual machines within its own virtual network. Such customer addresses are different than the provider addresses PA1-PA5. In FIG. 1, exemplary VMs 104a and 104b have customer addresses CA1 and CA3, respectively, in host device 102a, while VMs 104c, 104d, and 104e have customer addresses CA2, CA1, and CA3, respectively, in host device 102b.

Regardless of the exact nature of the CA assignment, one or more VMs may identify each other on a virtual network using their respective customer addresses.

In the example of FIG. 1, VMs 104a and 104c share the same virtual network 108a, and may communicate with each other using customer addresses CA1 and CA2, respectively. As another example, VMs 104b and 104e may communicate with each other over virtual network 108b using customer addresses CA3 and CA2, respectively.

It should be appreciated, however, that embodiments are not limited to this particular addressing technique, and in general, may implement any suitable mechanism for assigning addresses to virtual machines hosted in computing devices interconnected by a physical network. For example, VMs hosted on the same computing device may share a common provider address, and distinguish themselves by unique layer-2 MAC addresses.

Regardless of the specific nature of addressing for virtual machines and host computing devices, in some embodiments, a translation of customer addresses (CA) to provider addresses (PA) may be performed by host devices 102. The host devices 102 may control access to the underlying hardware by its hosted virtual machines. In some embodiments, virtual machines 104 may not have direct access to hardware resources in the host devices 102. Instead, access to physical memory and hardware may be delegated to the VMs 104 by special software in the host devices 102.

For example, in some embodiments, the host devices 102 may control access to network interface cards (NICs), or other hardware components, that couple the host devices 102 to the physical network 106. As such, software in the host devices may have a certain level of supervisory control over communication by the VMs 104.

Figure 2A:
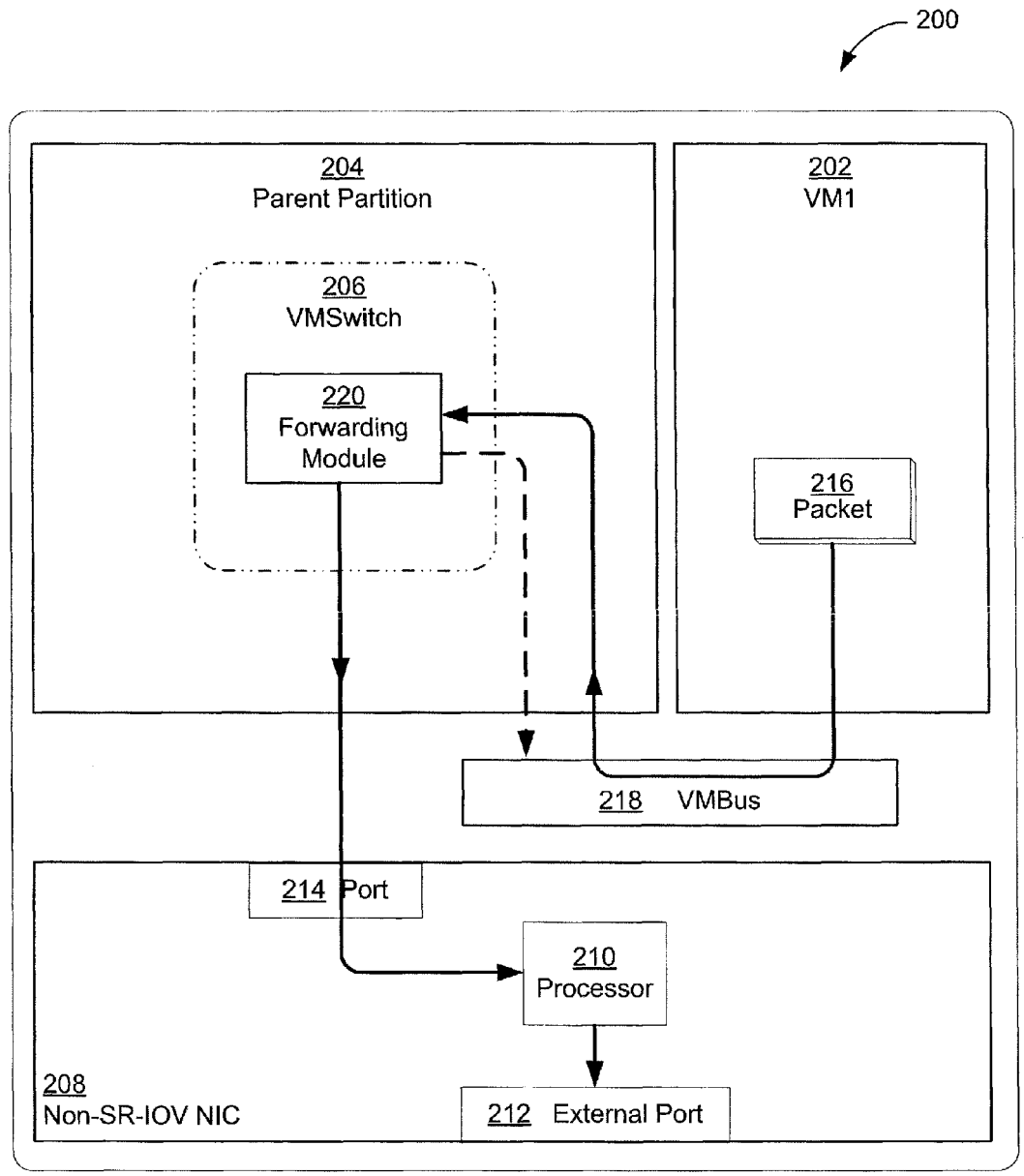
FIG. 2A is a schematic illustration of a host computing device operating a virtualized computing environment that uses a conventional technique for transmitting data.
Figure 2B:
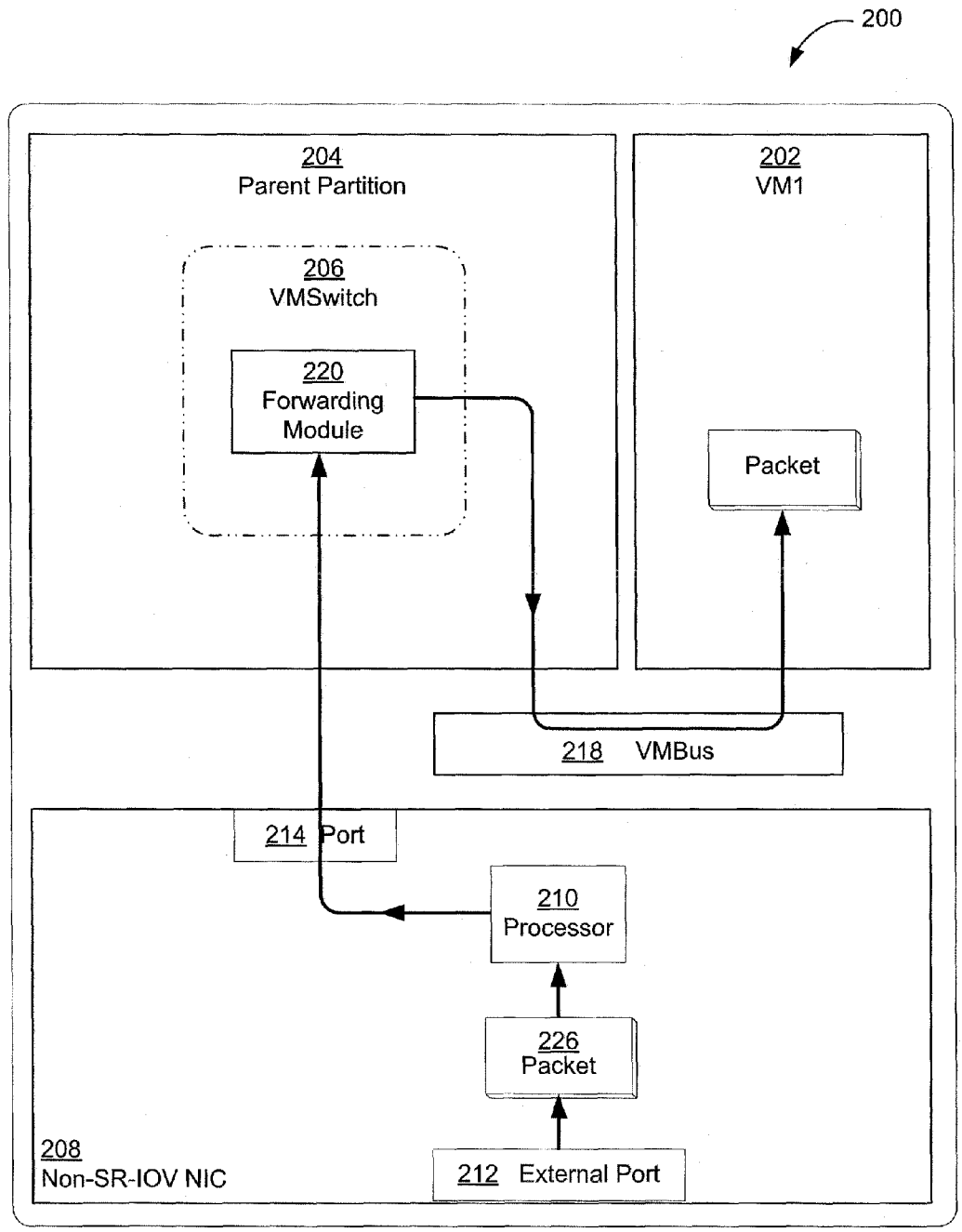
FIG. 2B is a schematic illustration of a host computing device operating a virtualized computing environment that uses a conventional technique for receiving data.

FIGS. 2A and 2B illustrate examples of transmitting and receiving data in a virtualized computing environment, according to conventional techniques. FIG. 2A illustrates computing device 200 operating a virtual computing environment. The virtual computing environment comprises one or more logical partitions. Each partition has its own isolated execution environment, operating as a virtual machine, such as virtual machine 202.

One of the partitions is designated as a parent, or root, partition 204. The parent partition 204 can have administrative control over the virtual machines. In some embodiments, the parent partition 204 may have a virtual switch, such as VMSwitch 206, which may forward data to and from the virtual machines. The parent partition 204 can also control and arbitrate access by the virtual machine 202 to the underlying hardware, such as a network interface controller (NIC) 208.

The NIC 208 can be integrated into the device 200, or it can be a peripheral component of the device 200. Regardless of the exact nature of the NIC 208, it provide a communication interface between the device 200 and a network. The NIC 208 can have a processor 210 and one or more communication ports, such as external port 212 and internal port 214.

FIG. 2A illustrates one example of transmitting a packet in a virtualized computing environment, according to a conventional technique. A packet 216 is sent by the VM 202 via a communication medium, such as virtual bus 218, as is known in the art. The packet 216 can be, for example, an IP packet or an Ethernet frame generated by the software of the virtual machine 202.

The virtual bus 218 can be implemented in software and can comprise one or more logical channels that enable communication between the parent partition 204 and virtual machines, such as VM 202. The virtual bus 218 transfers the packet 216 to the parent partition 204, and the packet 216 is processed by a virtual switch, such as the VMSwitch 206. The VMSwitch 216 can be a software switch that provides switching and networking connectivity for virtual machines, such as VM 202. The VMSwitch 216 can have software, such as a forwarding module 220, that determines the appropriate destinations of packets. The destinations can be determined by examining various information contained in the packets or packet headers.

If the destination of the packet is another VM connected to the same VMSwitch 206, then the packet is forwarded to the local VM through the virtual bus 218. Otherwise, the packet is forwarded to the NIC 208. The communication between the parent partition 204 and the NIC 208 can be enabled by a communication port, such as port 214. The packet can then be processed by the NIC processor 210, and forwarded to external port 212 for transmission to a network or external device.

FIG. 2B illustrates one example of a receive path in a computing device 200 operating a virtualized computing environment, according to a conventional technique. In general, the flow of data is the reverse of that shown in FIG. 2A, in that data received at the NIC 208 passes through the parent partition 204, and is forwarded to the destination VM 202 via the virtual bus 218.

As shown in FIG. 2B, when a packet 226 is received by the NIC 208 at an external port 212, the packet can be processed by the processor 210 and forwarded to the parent partition 204 via the communication port 214. The packet is received at the VMSwitch 206, to be forwarded to the appropriate destination VM. The forwarding module 220 forwards the packet, via the virtual bus 218, to the destination virtual machine 202.

In the examples illustrated in FIGS. 2A and 2B, communication to and from the VM 202 passes through the parent partition 204. The parent partition 204 is responsible for processing and forwarding each individual packet that is transmitted and received by the VM 202. If the computing device 200 implements network policies, such as address translation and/or security policies, then the software stack in the parent partition 204 is responsible for implementing and enforcing these policies for each packet.

This processing by the parent partition 204 typically involves several steps, including copying or mapping data from a VM address space to a parent partition address space (and vice versa) and/or simulating interrupts in the VM 202 and parent partition 204. These operations can consume a substantial amount of CPU cycles in the host computing device 200 and introduce non-negligible extra latency in data paths.

The inventors have recognized and appreciated that improvements in efficiency and delay can be achieved by allowing data traffic to bypass the software stack of the parent partition, and instead perform processing directly in the NIC. In some embodiments, the NIC may communicate directly with VMs, without being required to rely on the parent partition. In some embodiments, the MC may apply network policies directly to packets, which may relieve some of the processing burden in the parent partition.

If the processing and memory capabilities of the NIC are limited, then the NIC may not be able to store enough information to process and forward every packet. In such cases, the inventors have recognized and appreciated that the NIC may forward the packets to the parent partition for processing. Furthermore, it should be appreciated that this technique of splitting the data path and offloading processing and information storage to the NIC is not limited to any particular network policy, and may be applied for any suitable reason to process packets communicated to and from VMs.

Figure 3:
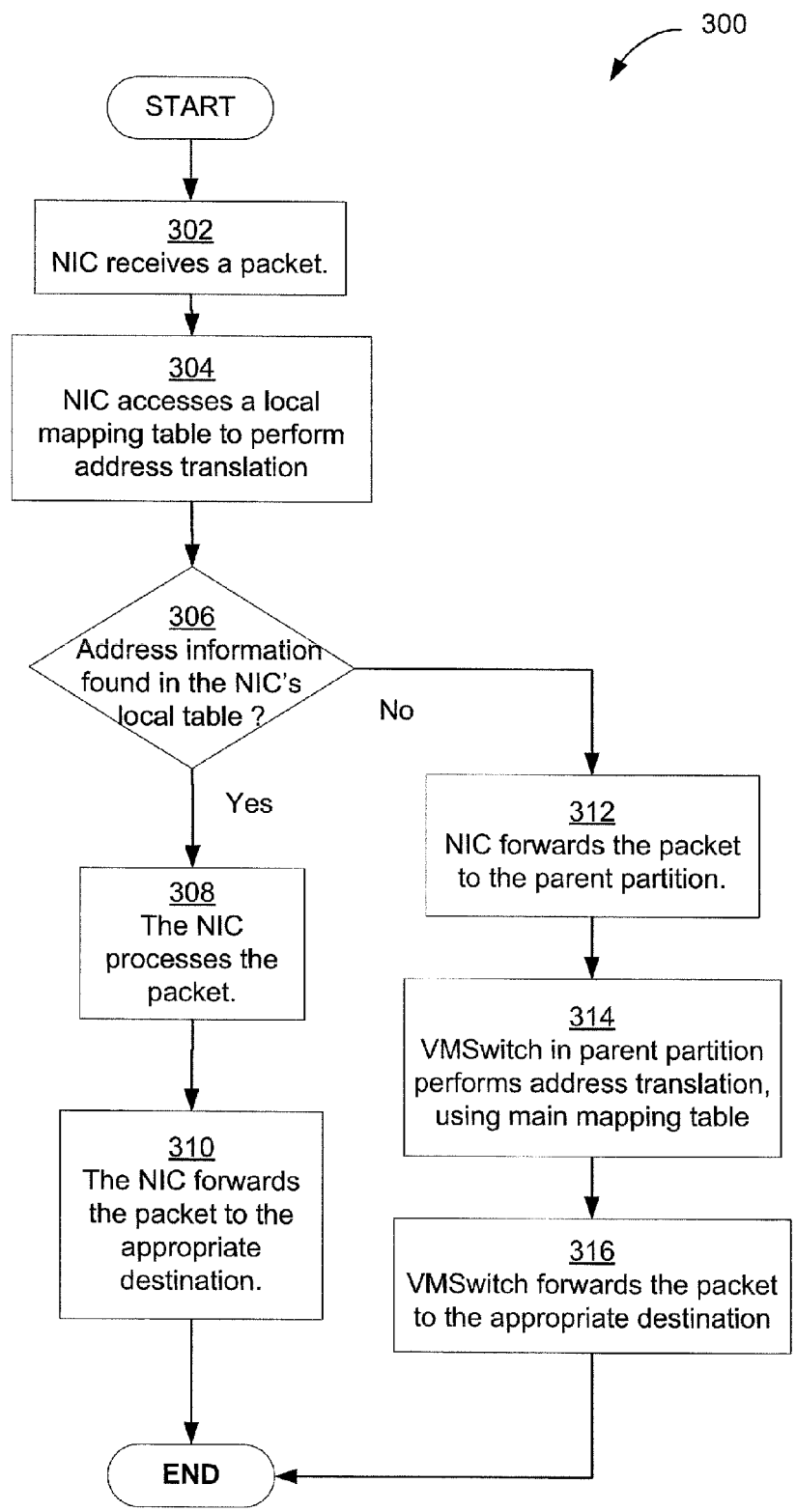
FIG. 3 is a flow chart of an embodiment of a method of communicating information in a virtualized computing environment in which a network interface controller (NIC) is adapted to implement network policies.

FIG. 3 is a flowchart of one example of a method 300 of operating a NIC that is enabled to process and store information related to network policies, according to some embodiments. In act 302, a NIC may receive a packet, which may be an inbound packet received from an external network or may be an outbound packet sent by a local VM.

In act 304, the NIC may access locally stored information to determine if it has appropriate rules or policies for processing the packet. This information may be stored in any suitable format and be used for any suitable purpose. For example, the information may be an mapping table for performing address translation in a virtual networking environment, or it may be an access control list for determining authorization levels for VMs to receive certain packets. Regardless of the specific nature of the locally stored information, the information in the NIC may be used for processing packets, and the NIC may not be required to forward the packets to the parent partition.

If it is determined in act 306 that the NIC has applicable information related to the packet, then in act 308, the NIC may use this information to process the packet. This processing may include, for example, translating a customer address (CA) to a provider address (PA), determining an access control authorization, or any other suitable network policy that may be applied to a packet. It should be appreciated, however, that the processing by the NIC is not limited to using locally stored information.

In some embodiments, the NIC may perform processing that also relies on information other than that offloaded from the parent partition. For example, the NIC may encapsulate or decapsulate the packet with an appropriate header. Such encapsulation and decapsulation may be used to transmit and receive, respectively, addressing information that may be used, in conjunction with the offloaded information, to determine a destination of the packet. Alternatively or additionally, encapsulation and decapsulation may be performed for any suitable reason by the NIC. Regardless of the specific reasons, the NIC may be adapted to encapsulate and decapsulate packets, and may not be required to access the software stack of the parent partition.

Although embodiments are not limited to any particular method of encapsulation and decapsulation, the inventors have recognized and appreciated that the GRE protocol may provide benefits for virtualized networking. In such embodiments, address information may be stored in a field of the GRE header, such that administering and maintaining a virtualized network may be more scalable and efficient. In general, however, the NIC may use any suitable encapsulation protocol in which address information may be communicated in encapsulation headers.

In act 310, the NIC may forward the packet to the appropriate destination. For outbound packets, the destination may be a device or another VM on the external network, while for inbound packets, the destination may be a local VM in the host computing device that interoperates with the NIC.

If, in act 306, the NIC determines that it does not have sufficient information to process and forward the packet, then in some embodiments, the NIC may forward the packet to the parent partition, in act 312. However, it should be appreciated that the NIC may forward the packet to the parent partition for any suitable reason.

In act 314, the packet may be received and processed at a virtual switch in the parent partition. In some embodiments, the virtual switch may be responsible for forwarding the packet to the appropriate destination. Processing in the virtual switch may include, for example, accessing stored information. In some embodiments, this may be information that was not offloaded to the NIC. The information may be, for example, a table containing mapping information for performing address translation, or an access control list for security authorization. Regardless of the exact nature of this information, the virtual switch may process the packet according to this information, and, in act 316, forward the packet to the appropriate destination. For example, outbound packets, the packet may be sent back to the NIC for transmission, while inbound packets may be forwarded to a virtual bus for transmission to a virtual machine.

Figure 4A:
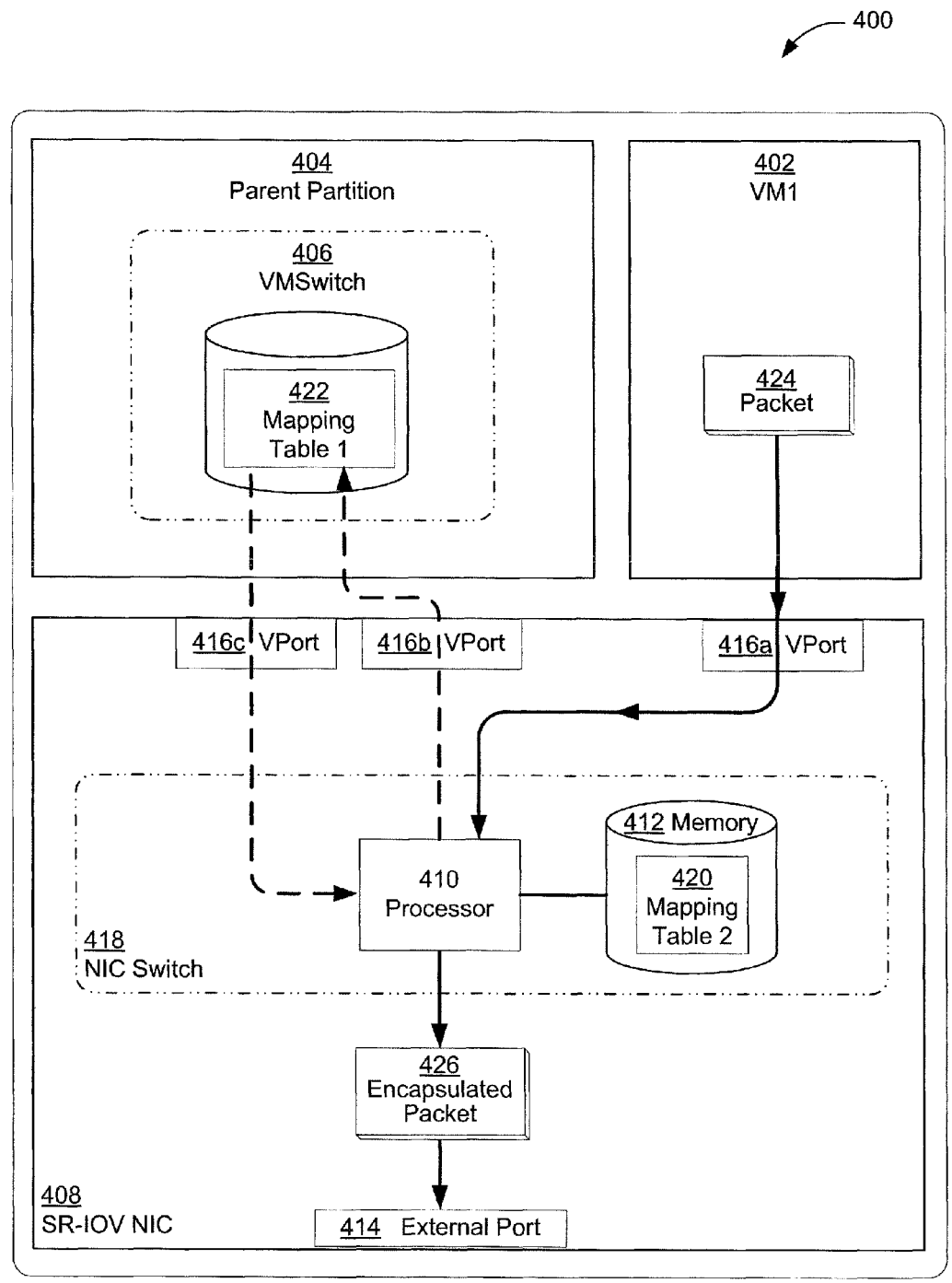
FIG. 4A is a schematic illustration of an embodiment of a transmit path in a host computing device operating a virtualized computing environment in which a network interface controller (NIC) is adapted to implement network policies.
Figure 4B:
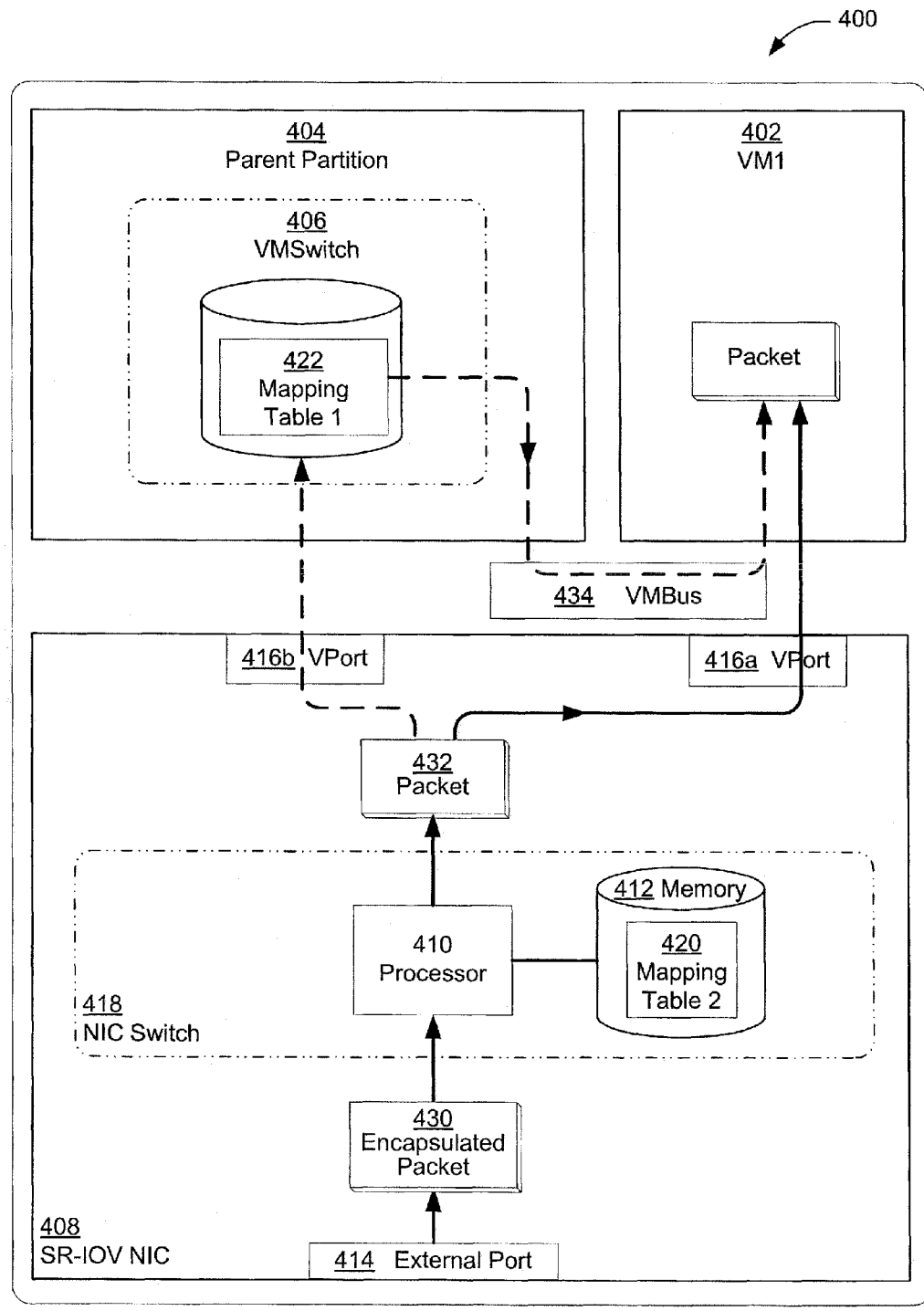
FIG. 4B is a schematic illustration of an embodiment of a receive path in a host computing device operating a virtualized computing environment in which a network interface controller (NIC) is adapted to implement network policies.

Examples of host computing devices that implement the process 300 are illustrated in the block diagrams of FIGS. 4A and 4B. In particular, FIGS. 4A and 4B show examples of a transmit path and a receive path, respectively, in a computing device in which the NIC is enabled to communicate directly with virtual machines and process packets using information that has been offloaded from the parent partition.

The NIC in FIGS. 4A and 4B is adapted to perform encapsulation and decapsulation to provide and obtain, respectively, information that may used in the processing of packets. For example, this information may be addressing information, such as tenant ID or Virtual Subnet ID, used in routing the packet between virtual machines.

Host computing device 400 operates a virtualized computing environment in which the physical host is partitioned into virtual machines (VMs), such VM 402, and a parent partition 404. It should be appreciated, however that this is merely an illustrative example, and different embodiments may utilize different partitioning arrangements, with any suitable number of VMs.

In FIGS. 4A and 4B, the parent partition may include a virtual switch, such as VMSwitch 406, that forwards packets communicated to and from the VM 402. The host computing device 400 may have hardware, such as a NIC 408, to communicate with an external network. The NIC 408 may have a processor 410 and a memory 412 for storing information. The NIC 408 have a port, such as external port 414, to communicate with an external network.

In some embodiments, the NIC 408 may be enabled to communicate directly with the VM 402, bypassing the parent partition 404. For example, a virtual communication interface, such as virtual port 416a, may be provided to allow the NIC 408 to communicate directly with VM 402. Various techniques may be used to implement a virtual port 416a that enables direct communication between the NIC 408 and the virtual machine 402. For example, it is known to use the SR-IOV protocol to enable direct communication between a NIC and virtual machines. The SR-IOV protocol allows for the partitioning the resources of a physical NIC into one or more virtual NICs, each of which may act as a communication interface for a particular VM.

It should be appreciated, however, that the invention is not limited to using the SR-IOV protocol, and in general may use any suitable hardware virtualization technique that allows a NIC to directly communicate with VMs, bypassing the software stack of the parent partition. Furthermore, the virtual communication interface between the NIC 408 and the VM 402 is not limited to a virtual port, such as virtual port 416a, and in general may be implemented by any suitable software interface.

Alternatively or additionally to virtual port 416a, SR-IOV may enable other virtual ports, such as virtual ports 416b and 416c, to communicate with the parent partition 404. In some embodiments, the NIC 408 may have a software switch, such as NIC switch 418, that forwards packets to the appropriate virtual port. Regardless of the exact nature of NIC switch 418, the NIC 408 may have the ability to process and forward packets to an appropriate destination.

In some embodiments, while communication between VM 402 and NIC 408 may bypass the parent partition 404, the policies and rules governing the communication between the VM 402 and NIC 408 may still be under the control of the parent partition 404 and its operating system. For example, in some embodiments, there may be mechanisms and protection to prevent a virtual machine, such as VM 402, from accessing system resources, such as memory and interrupt resources, that the parent partition 404 has not explicitly made available to the VM 402.

It should be appreciated that the examples in FIGS. 4A and 4B are not limited to embodiments using any particular protocol or communication interface between the NIC 408 and the VM 402. In general, any suitable technique may be used that enables the NIC to communicate directly with virtual machines in a secure manner. Regardless of the specific technology that enables direct communication between and NIC with VMs, the inventors have recognized and appreciated that such techniques may be used as part of a solution to offload processing information storage of network policies from the parent partition.

The inventors have recognized that such techniques may allow the parent partition 404 to maintain control over the general control of the flow of traffic, while not having to directly process packets on an individual basis. In some embodiments, the network policies, such as security and routing, and communication to and from the VMs can be enforced remotely by the parent partition 404 at the NIC 408.

FIG. 4A illustrates an example of a transmit path when the NIC 408 is configured to perform processing that has been offloaded from the parent partition 404. In this example, the NIC 408 performs encapsulation of packets and address translation for virtualized networking.

Offloading information from the parent partition 404 to the MC 408 may be implemented in various ways. In some embodiments, the NIC 408 may have stored information, such as a local mapping table 420, in memory 412. This local mapping table 420 may be, for example, a portion of a full mapping table 422 that is stored in the parent partition 404. The information in this mapping table 422 may be used, for example, to perform address translation in order to forward packets to an appropriate destination. Alternatively or additionally, the table 422 may be an access control list that may indicate which virtual machines are authorized to receive a packet.

Regardless of the exact nature of the information stored in table 422, some or all of this information may be offloaded to the NIC 408 as local mapping table 420. The mapping table 420 in the NIC 408 may be stored in any appropriate storage area, such as a non-volatile memory, of the NIC 408.

In FIG. 4A, a packet 424 is transmitted from the VM 402, via virtual port 416a, to the NIC 408. The packet is received at processor 410, which may perform suitable processing of the packet. For example, the processor 400 may access local mapping table 420, to determine appropriate forwarding information for the packet.

If such information is found in the local mapping table 420, then the processor 410 may use that information to process the packet. In some embodiments, such processing may include determining a destination of the packet and encapsulating the packet with routing information, to create an encapsulated packet 426. The routing information may be, for example, a tenant ID or Virtual Subnet ID obtained from the virtual port associated with the transmitting VM 402. The encapsulated packet 426 may then be forwarded by the processor 410 to an external port 414 for transmission over a network.

However, if no information is found in the local mapping table 420, then the processor 410 may send the packet to the parent partition 404 via port 416b. In some embodiments, this port 416b may be, for example, a virtual exception port used specifically for exceptions caused when information is missing from the local mapping table 420 in the NIC 408.

The VMSwitch 406 in the parent partition 404 may receive the packet, and determine a destination for the packet. For example, the virtual switch 406 may use the mapping table 422 to determine an address translation or an access control policy for the packet. When this mapping information is determined, the virtual switch 406 may then forward the packet, with this mapping information, to the NIC 408 via virtual port 416c. In some embodiments, the mapping information may be transmitted using a separate and secure channel, such as out-of-band (OOB) data. In general, however, the mapping information may be transmitted from the parent partition 404 to the NIC 408 by any suitable technique, implemented in software, hardware, or firmware, as appropriate.

Regardless of the technique of sending mapping information with the packet, the mapping information that was determined from table 422 by the parent partition 404 may be sent to the NIC 408 to be transmitted along with the packet. When the MC processor 410 receives the packet and the mapping information, the processor 410 may process the packet for transmission over the external network via external port 414.

The processing performed by NIC processor 410 may include, for example, encapsulating the packet, creating encapsulated packet 426. The encapsulation can be performed using any suitable encapsulation protocol, such as GRE. The encapsulated header may be adapted to indicate certain information, such as a logical network ID, or tenant ID or Virtual Subnet ID, that was obtained from table 420 or 422.

Although not shown in FIG. 4A, the packet may also be directed to a local VM in the host computing device 400. In such cases, the NIC 408 may directly forward the packet to the appropriate virtual port associated with the destination VM, and may skip the process of encapsulating the packet.

Furthermore, it should be appreciated that the NIC 408 may obtain mapping information from the parent partition 404 according to any suitable technique. For example, the MC 408 may temporarily store the packet in local memory 412 and send a request for mapping information to the parent partition 404. Regardless of the specific nature of how the NIC 408 obtains mapping information from the parent partition 404, the NIC 408 may send a request to the parent partition 404 when the NIC 408 is unable to find appropriate information in its local memory 412 to process the packet.

FIG. 4B illustrates an example of a receive path in computing device 400 in which NIC 408 is enabled to process information that has been offloaded from the parent partition 404. In this example, the NIC 408 performs decapsulation of packets received from an external network. The decapsulation may yield information that is used to perform address translation for packets in a virtualized networking environment. In general, however, the NIC 408 may perform any suitable processing, using information offloaded from the parent partition 404.

In FIG. 4B, the parent partition 404 has information, which may be in the form of mapping table 422, which may be used to process and forward packets to an appropriate destination. The NIC 408 may also have its own local information, which may also be in the form of mapping table 420, which may be used to forward packets without having to access the parent partition 404.

It should be appreciated that the invention is not limited to storing and using information in tables, nor does the information necessarily relate to address mapping. In general, the parent partition 404 may offload any suitable information to the NIC 408, and the information may be used for any appropriate processing of packets.

In FIG. 4B, the NIC 408 may receive encapsulated packet 430 via external port 414. This encapsulated packet 430 may have been received, for example, from another host computing device through an external network, Regardless of its source, the encapsulated packet 430 may comprise a packet with an attached header. The encapsulation may have been performed, for example, using an encapsulation protocol such as GRE.

Regardless of the specific technique used for encapsulation and decapsulation, the NIC processor 410 may decapsulate the encapsulated packet 430 to obtain information related to determining a destination for the packet. This information may be, for example, an identifier of a virtual network, such as a tenant ID or Virtual Subnet ID, that may be used to translate a provider address (PA) to a customer address (CA) of a virtual machine. Regardless of the specific nature of the information obtained from the header of the encapsulated packet 430, the NIC processor 410 may use this information to determine an appropriate rule or policy in mapping table 420.

The policy or rule in mapping table 420 may allow the NIC processor 410 to determine appropriate processing and forwarding of the packet obtained after decapsulation. For example, the NIC processor 410 may use the mapping table 420, along with a tenant ID or Virtual Subnet ID obtained from the packet header, to determine an address translation for the packet. If such a determination can be made, the NIC processor 410 may forward the packet to the virtual machine 402 via virtual port 416a.

If, on the other hand, no determination can be made by the NIC 408 using mapping table 420, then the packet may be routed to the parent partition 404 via virtual port 416b. Routing the packet to the parent partition 404 may occur, for example, if the mapping table 420 does not contain information that can be used to determine an appropriate destination for the packet. In such cases, the NIC 408 may forward the packet to the parent partition 404 for routing the packet. In general, however, the NIC 408 may forward the packet to the parent partition 404 for any suitable reason.

Regardless of the specific reason for forwarding the packet to the parent partition 404, the packet may be received at VMSwitch 406, in the parent partition 404. The VMSwitch 406 may forward the packet using stored information, such as mapping table 422. For example, if the mapping table 422 stores a mapping between customer addresses (CAs) and provider addresses (PAs) for use in address translation, then the parent partition 404 may determine an appropriate virtual machine to which to forward the packet. Alternatively or additionally, the stored information in the parent partition may relate to any suitable network policy, such as an access control list for security authorization.

In some embodiments, the virtual switch 406 may then forward the packet, via a virtual bus 434, to virtual machine 402. In general, however, the invention is not limited to any specific type of transmission medium or interface between parent partition 404 and virtual machine 402.

The examples in FIGS. 4A and 4B illustrated some possible embodiments of splitting data paths between the NIC 408 and the parent partition 404. It should be appreciated that such techniques may be used for any appropriate network policy, or combination of network policies. For example, in some embodiments, the parent partition 404 may offload access control list (ACL) enforcement to the NIC 408. Such ACL policies may indicate which VMs are authorized to receive certain types of information in packets. In such embodiments, if a packet matches an "allow rule" that has been offloaded to the NIC, then the packet may be forwarded to its destination. Otherwise, the packet may be sent to the parent partition 404 for processing.

Furthermore, it should be appreciated that the invention is not limited to using encapsulation to implement network virtualization. In general, network policies may be offloaded to the NIC in any suitable implementation of a virtualized computing environment. For example, alternatively or additionally to encapsulating packets with virtual network identifiers, the NIC may perform address-re-write to translate between customer addresses and provider addresses. In some embodiments, this may function as a stateless reversible Network Address Translation (NAT), with the originating endpoint rewriting the source and destination addresses and the destination performing the reverse translation before forwarding the packet to the destination VM.

Regardless of the exact nature of implementing network virtualization and address translation, the inventors have recognized and appreciated that network policy information offloaded to the NIC may be determined using a variety of techniques. For example, the parent partition 404 and/or the VM 402 may determine which information should be stored in the NIC for faster processing of packets. This determination may be made using any suitable criteria.

Figure 5:
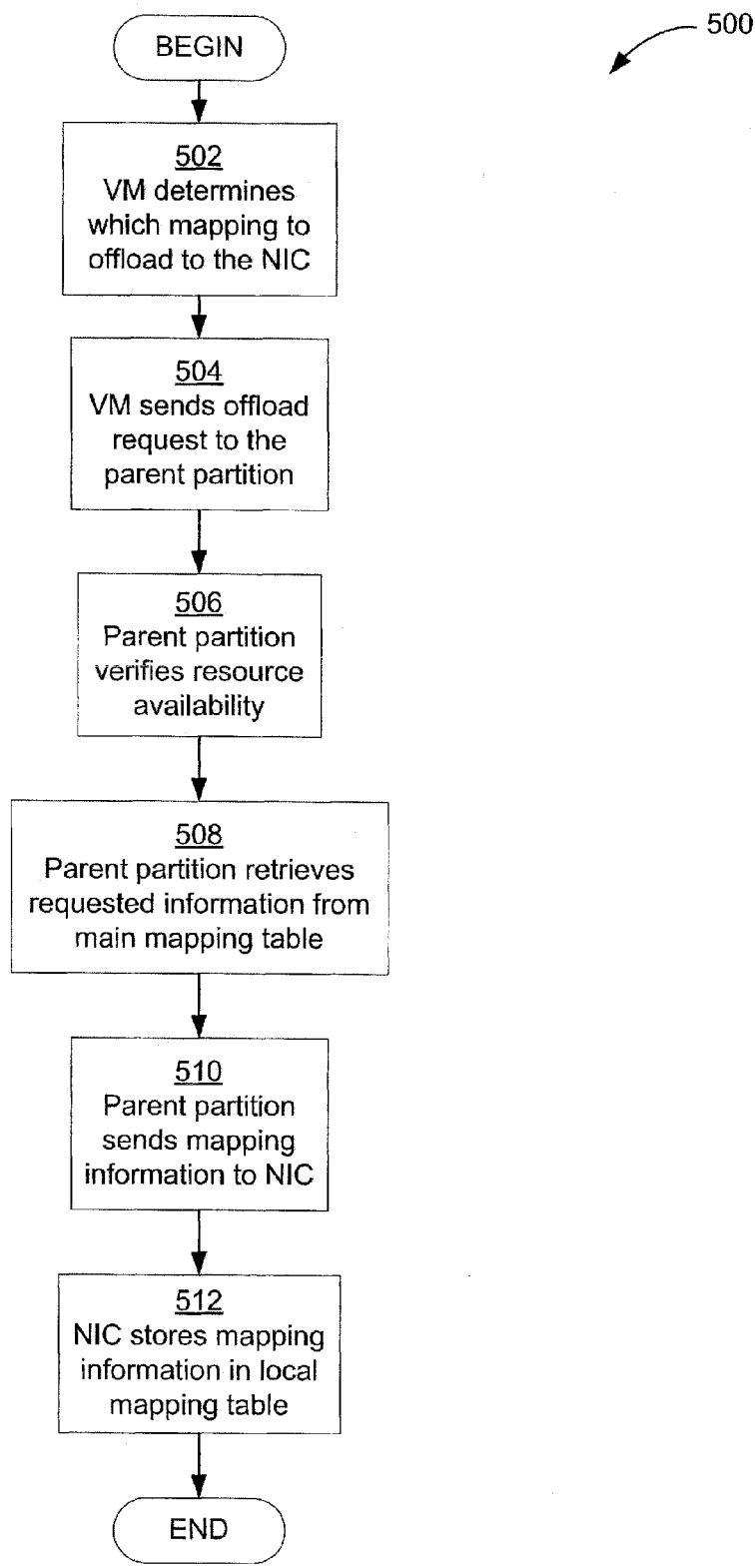
FIG. 5 is a flow chart of an embodiment of a method of a VM requesting information to be offloaded from the parent partition to the NIC.

FIG. 5 illustrates one example of a method 500 for a VM to request that information be offloaded from the parent partition to a NIC. However, it should be appreciated that, in general, the offloading of information from the parent partition to the NIC may be initiated by any appropriate entity, such as the parent partition. In some embodiments, the VM may decide which mapping to offload according to a suitable criteria and/or constraints. In some embodiments, the VM may be constrained to request that a predetermined amount, or quota, of information be offloaded. It may be the responsibility and discretion of the networking stack of the VM to decide which mappings should be offloaded to the NIC.

In FIG. 5, the VM first determines, in act 502, which mapping should be offloaded to the NIC. This may be determined based on the frequency of requests for mapping of packets, or based on any other suitable criteria. In act 504, the VM may send a request to the parent partition for offloading the mapping to the NIC. The parent partition may, in act 506, verify whether sufficient resources are available on the NIC to store this mapping.

In act 508, the parent partition may retrieve the requested mapping information from memory store of the hosting device. In some embodiments, for example, the mapping information may be retrieved from a mapping table. In act 510, the parent partition may then send this mapping information to the NIC. This mapping information may be sent by any suitable technique, such as a secure channel using out-of-band data. The NIC may store this offloaded mapping information in its local memory, in act 512.

Figure 6:
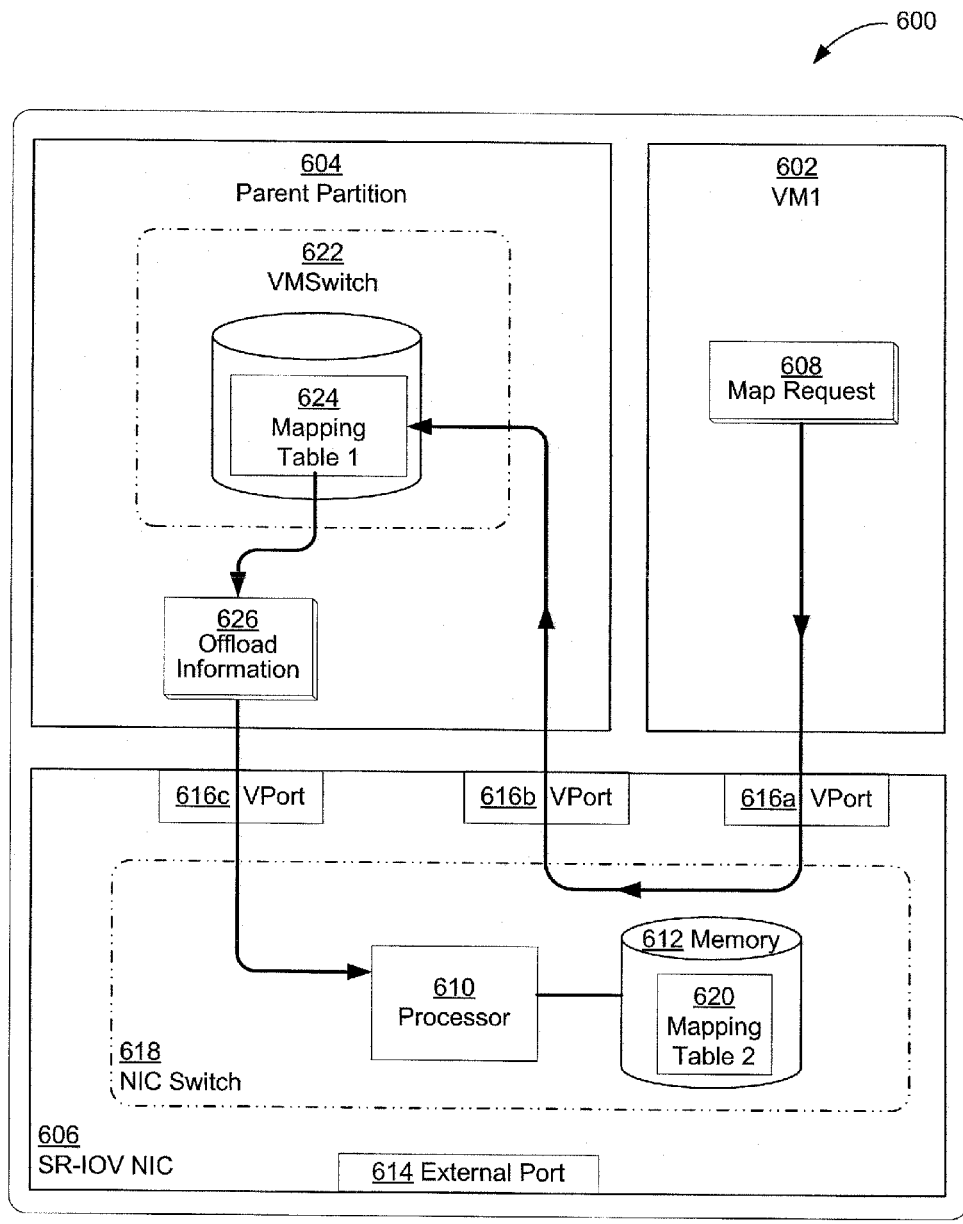
FIG. 6 is a schematic illustration of an embodiment of a host computing device operating a virtualized computing environment, in which a virtual machine requests information to be offloaded to a network interface controller (NIC) adapted to implement network policies.

FIG. 6 illustrates an example of a host computing device 600 that implements method 500. Host device 600 operates a virtualized computing environment in which a VM 602 requests that information be offloaded from the parent partition 604 to an NIC 606. The VM 602 sends a request 608 for offloading mapping information to the NIC 606 via virtual port 616a.

The request is then forwarded by the NIC switch 618 to the parent partition 604, via virtual port 616b. A virtual switch, such as VMSwitch 622, in the parent partition may verify resource availability on the NIC 606 and retrieve the requested mapping from an appropriate source, such as a mapping table 624. The virtual switch 622 may then offload the mapping information 626 to the NIC 606, via a virtual port 616c. An NIC processor 610 may receive the offloaded information 626 and store it in a mapping table 620 in NIC memory 612.

It should be appreciated however that any appropriate information may be offloaded from the parent partition 604 to be stored in the NIC 606. For example, the information may relate to access control lists or any other suitable network policy that may be implemented by the NIC 606. Furthermore, the offload request from the VM 602 to the parent partition 604 may be achieved by any suitable communication technique, not necessarily limited to communication via virtual ports of the NIC 606.

The information that is offloaded to the NIC 606 may be determined by a number of techniques. Some exemplary techniques of determining which information to offload to the NIC 606 are given below:

SFLOW: Statistical data may be gathered by sampling network traffic. The statistical data may be used to offload the mapping for those connections that are responsible for the most traffic.

Traffic monitoring in the host: Periodic polling of the NIC may be used to identify the most active connections. The mapping corresponding to the most active connections may be offloaded to the NIC. When the level of activity on a connection drops, the mapping may be removed from the hardware to make room for a more active connection.

In some embodiments, each virtual machine may have a unique address that identifies the machine. Such an addressing system may be implemented using any suitable protocol, for example, a Medium Access Control (MAC) protocol. The route that a packet takes may be determined, at least in part, by using a MAC address associated with each virtual machine. The MAC address of the source VM and destination VM may be sent in each packet.

Figure 7:
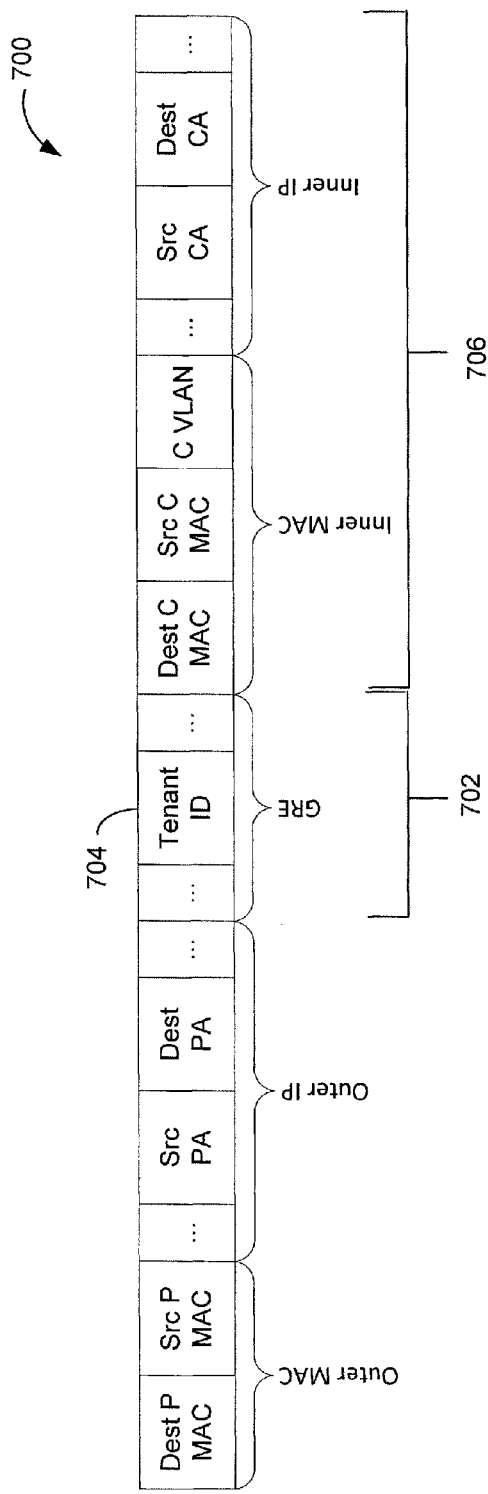
FIG. 7A is a simplified illustration of an embodiment of routing and address information associated with a packet that is communicated in a virtualized computing environment in which a network interface controller (NIC) is adapted to implement network policies.
FIG. 7B is a simplified illustration of an embodiment of routing and address information associated with a virtual port in a NIC adapted to implement network policies in a virtualized computing environment.
FIG. 7C is a simplified illustration of an embodiment of routing and address information stored in, and used by, a host computing device operating a virtualized computing environment.
FIG. 7D is a simplified illustration of an embodiment of an encapsulated packet that includes a header adapted for use by a host computing device operating a virtualized computing environment.

FIG. 7A illustrates an example of information associated with a packet, such as an Ethernet frame, that may be transmitted from and received by VMs operating in a host computing system. In the example illustrated in FIG. 7A, the packet may have a Source Customer IP Address (Src CA) of 10.0.0.1, a Destination Customer IP Address (Dest CA) of 10.0.0.2, a Source Customer MAC address (Src C MAC) of 00:00:00:00:01 and a Destination Customer MAC Address (Dest C MAC) of 00:00:00:00:02.

FIG. 7B illustrates an example of information that may be associated with a virtual port allocated to a VM. In this example, the virtual port belongs to a tenant with tenant ID or Virtual Subnet ID of 1. The virtual port is configured with Customer MAC Address (C MAC) of 00:00:00:00:01, Provider MAC Address (P MAC) of 00:01:00:00:01, Customer IP Address (CA) of 10.0.0.1 and Provider IP Address (PA) of 10.1.0.1.

FIG. 7C illustrates a mapping table that stores information which may be used to perform address translation. The mapping table may map each {Tenant ID or Virtual Subnet ID, Customer IP Address (CA)} pair to a {Provider IP Address (PA), Provider MAC Address (P MAC)} pair. Such address translation may be used, for example, to determine either a source or destination virtual port for a packet. For example, the table in FIG. 7C can be used to determine that the packet shown in FIG. 7A originated from the virtual port shown in FIG. 7B.

In some embodiments, this translation may be performed by using a tenant ID or Virtual Subnet ID, which may be obtained, for example, from a header used to encapsulate the packet, as discussed above in connection with FIGS. 4A and 4B. In some embodiments, the tenant ID or Virtual Subnet ID may be stored in a field of the header, such that VMs may access the tenant ID or Virtual Subnet ID by decapsulating packets to obtain the header and the information stored in fields of the header.

FIG. 7D illustrates an example of an encapsulated packet 700 that may store a tenant ID or Virtual Subnet ID in a header, according to some embodiments. Various headers, and fields within headers, of a GRE-encapsulated packet are illustrated. In some embodiments, the encapsulated packet may have a header that includes space which may be used to communicate information, such as a tenant ID or Virtual Subnet ID. For example, the GRE header 702 may provide a field to carry the tenant ID or Virtual Subnet ID information of each packet. In some embodiments, the tenant ID or Virtual Subnet ID may be carried in the key extension 704 of the GRE header 702.

An NIC may send such a fully framed packet encapsulated using GRE, as shown in FIG. 7D, to transmit mapping information, such as a tenant ID or Virtual Subnet ID, along with the original data packet or data frame. In this example, the GRE protocol may encapsulate an inner frame, which may be an Ethernet frame 706 sent by a VM originating traffic. The Ethernet frame 706 may comprise an inner Ethernet MAC header followed by the inner IP header, followed by the IP payload. In some embodiments, the inner MAC header and the inner IP header may use customer address (CA) information, such as source and destination customer MAC addresses, corresponding to a virtual network on which the originating VM is communicating.

In some embodiments, the VM may not be aware of the GRE encapsulation, and may operate as if it is sending and receiving Ethernet frames, such as Ethernet frame 706. The GRE encapsulation may provide an interface between customer and provider address spaces. For example, the outer IP header and the outer MAC header may correspond to provider addresses (PA) that identify computing devices on a physical network fabric. The Key field 704 of the GRE header may be used to carry the tenant ID or Virtual Subnet ID that facilitates translation between customer and provider addresses.

While the example of FIG. 7D illustrates the use of GRE protocol, it should be appreciated that any suitable encapsulation and decapsulation protocol may be used that allows information, such as a tenant ID or Virtual Subnet ID, to be transmitted along with a packet, and that allows such information to be accessible by computing devices that are enabled to perform decapsulation.

In some embodiments, the NIC may perform encapsulation and decapsulation of GRE headers, without performing address translation. This may occur, for example, in scenarios where the NIC has limited memory to store mapping tables. In such cases, the NIC may request the parent partition to perform address translation. The information obtained from the header may be, for example, a tenant ID or Virtual Subnet ID, which may be communicated to the parent partition via a separate and secure channel, such as out-of-band data. Alternatively or additionally, the tenant ID or Virtual Subnet ID may be sent to the parent partition by any other suitable communication technique.

Such offloading of encapsulation without offloading address translation may be used, for example, in scenarios where memory on the NIC is limited. In such scenarios, the NIC may be enabled to perform encapsulation and decapsulation of packets, and rely on the parent partition to store and retrieve mapping information and to perform address translation.

It should be appreciated, however, that the invention is not limited to such scenarios, and in general there may be any suitable reason for the NIC to perform encapsulation and decapsulation of packets while requesting address translation by the parent partition.

Figure 8:
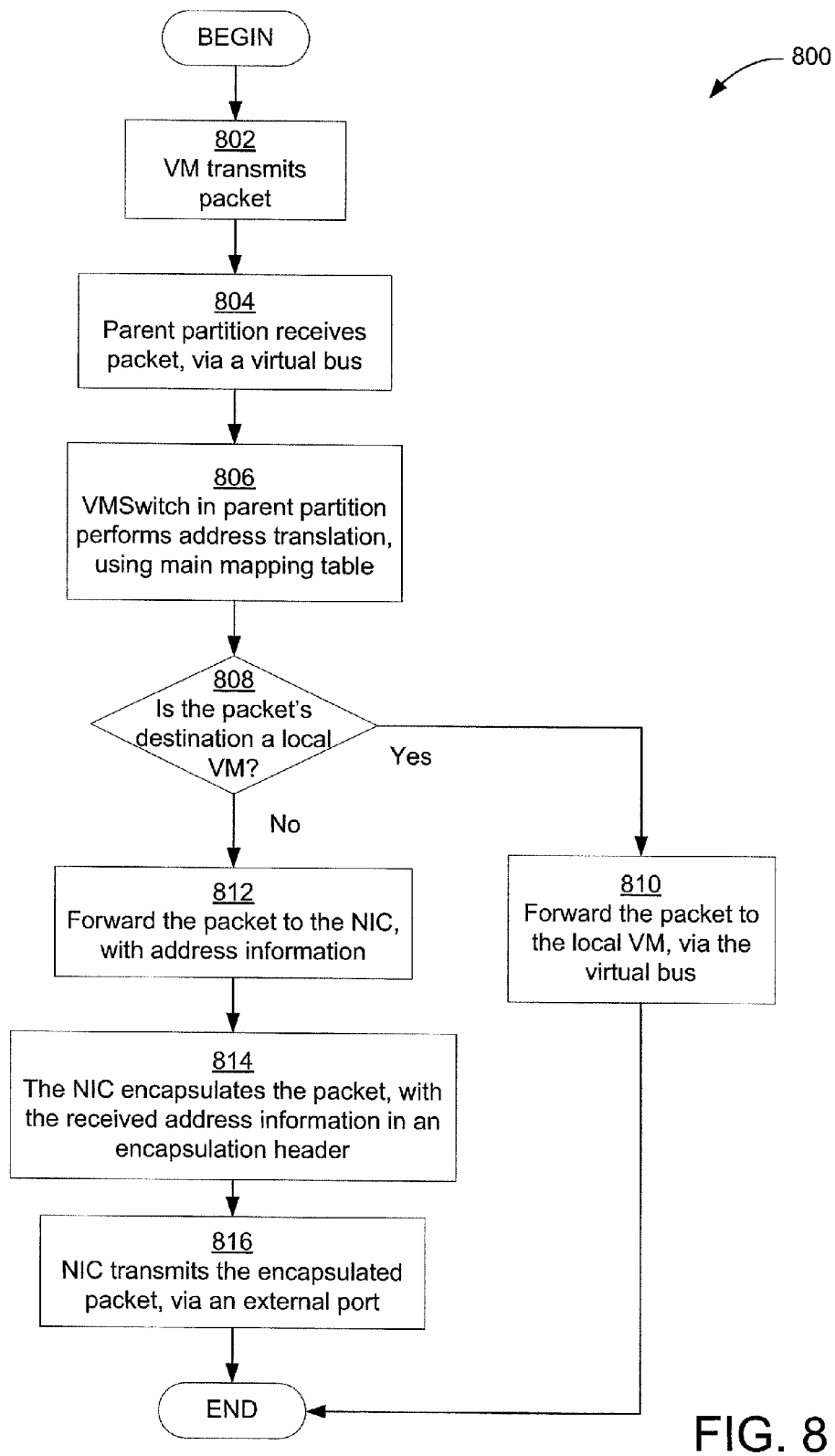
FIG. 8 is a flow chart of an embodiment of a method of transmitting data in a host computing device operating a virtualized computing environment, in which the NIC is adapted to perform encapsulation and communicates mapping information with the parent partition using out-of-band data.

FIG. 8 is a flow chart of a method 800 of transmitting a packet from a VM through a NIC which is enabled to perform encapsulation and decapsulation, and which receives mapping information from the parent partition to encapsulate the packet. In act 802, the VM transmits a packet, which is received by the parent partition, in act 804, through a virtual bus or other suitable communication medium.

In act 806, a virtual switch in the parent partition receives the packet and determines an appropriate forwarding for the packet. In some embodiments, the virtual switch may access a local mapping table to determine mapping information that may indicate an appropriate destination for the packet. Alternatively or additionally, the virtual switch may access information for any suitable network policy that applies to the packet.

In act 808, if the destination of the packet is a local VM, then the virtual switch forwards the packet back to the virtual bus, in act 810, for transmission to the destination VM. On the other hand, if the destination of the packet is external to the host computing device, then in act 812, the virtual switch forwards the packet to the NIC, with the mapping information that was determined from the stored mapping table. The mapping information may be sent by any suitable communication technique, such as a secure channel using out-of-band data.

The NIC receives the packet, with mapping information, from the parent partition and, in act 814, encapsulates the packet with the received mapping information. The encapsulation may be performed using any suitable encapsulation protocol, such as GRE. Regardless of the specific encapsulation protocol used, the mapping information obtained from the parent partition may be copied in a header that encapsulates the packet. In some embodiments, the mapping information may be a tenant ID or Virtual Subnet ID, identifying a virtual subnet, which may be stored in the key extension field of the GRE header. Regardless of the exact nature of the encapsulation and the information that is encapsulated along with the packet, any suitable network policy information may be encapsulated with the packet, for transmission over a network in act 816.

Figure 9:
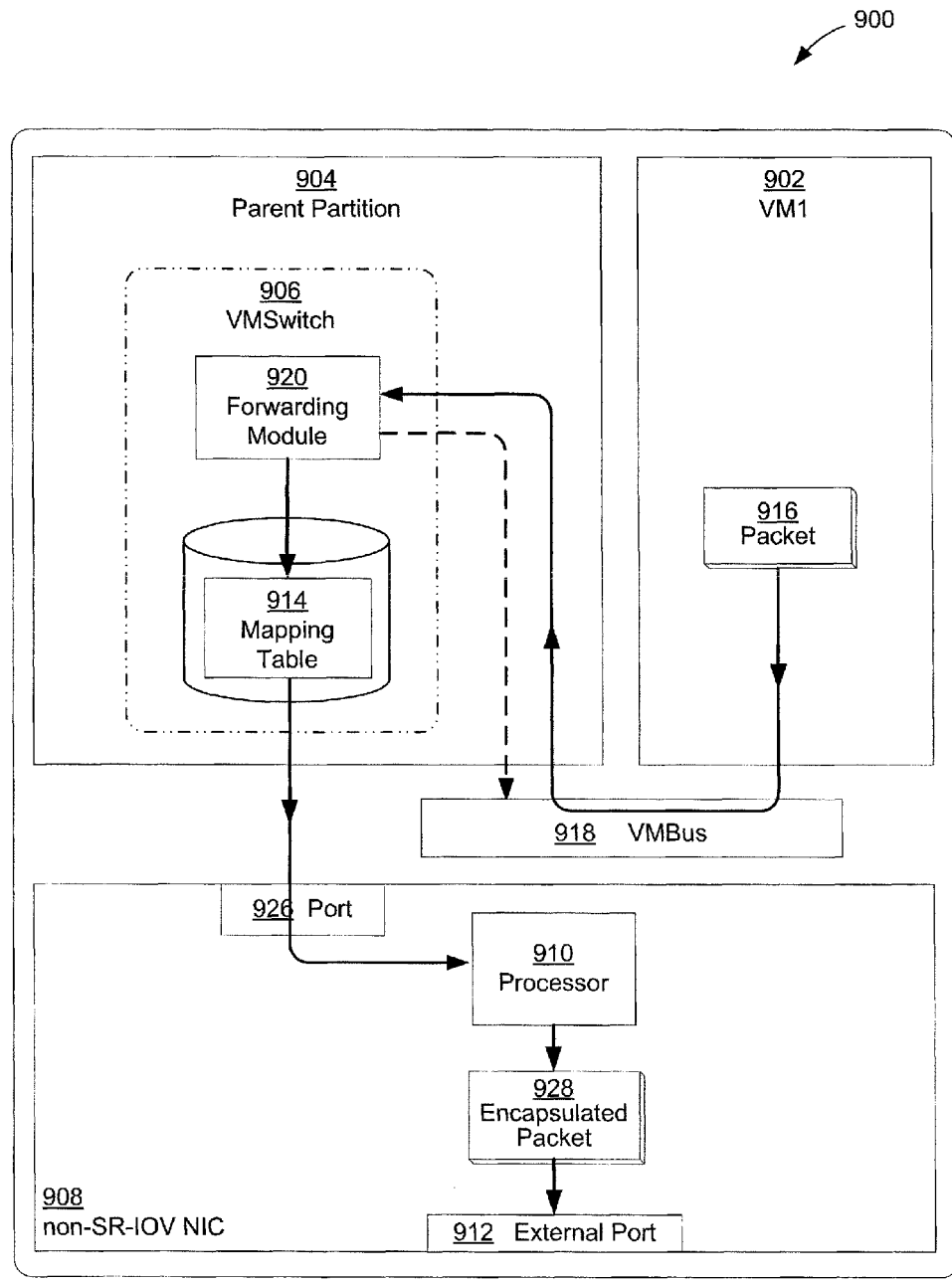
FIG. 9 is a schematic illustration of an embodiment of a transmit path in a host computing device operating a virtualized computing environment, in which the NIC is adapted to perform encapsulation and communicates mapping information with the parent partition using out-of-band data.

FIG. 9 illustrates an example of a packet transmission path in a host computing device 900 that implements method 800. The host computing device 900 operates a virtualized computing environment comprising virtual machines, such as virtual machine 902, and a parent partition 904. The parent partition 904 may have a virtual switch, such as VMSwitch 906, that forward packets to and from the virtual machines, such as VM 902.

The host computing device 900 may have a physical interface, such as NIC 908, to an external network. The NIC 908 may have a processor 910 that is enabled to encapsulate and decapsulate packets. The NIC 908 may also have various communication ports, such as external port 912 for communication with an external network.

The NIC processor 910 may encapsulate packets with an address mapping information, which may be obtained from a mapping table 914 in the parent partition 904. Alternatively or additionally, the NIC processor 910 may encapsulate packets with any appropriate network policy information obtained from the parent partition 904.

Packet 916 is transmitted from VM 902, via virtual bus 918, to the parent partition 904. However, that the exact number of virtual machines and the specific nature of communication medium between the virtual machine and the parent partition is not critical to the invention, and may have any suitable configuration.

A VMSwitch 906 in the parent partition 904 receives the packet and determines an appropriate forwarding for the packet. If the destination of the packet is a VM in the host computing device, then the forwarding module 920 forwards the packet, via the virtual bus 918, to the appropriate destination VM. If the destination of the packet is external to the host computing device, then the VMSwitch 906 may determine mapping information related to the packet. This mapping information may be obtained from stored information, such as a mapping table 914. In some embodiments, mapping table 914 may be used to determine the tenant ID or Virtual Subnet ID of the destination, indicating the virtual subnet on which the destination resides, given the destination's customer address (CA) and MAC address.

Regardless of the exact nature of the mapping information obtained from the mapping table 914, the mapping information may be sent with the packet to the NIC 908. In some embodiments, the parent partition may provide the mapping information through a secure channel, such as out-of-band (OOB) data, to the NIC 908 via port 926. The NIC processor 910 may create and attach a GRE header to the packet. The mapping information may be written into a field of the GRE header, and the encapsulated packet 928 may be sent, via external port 912, to an external network.

Figure 10:
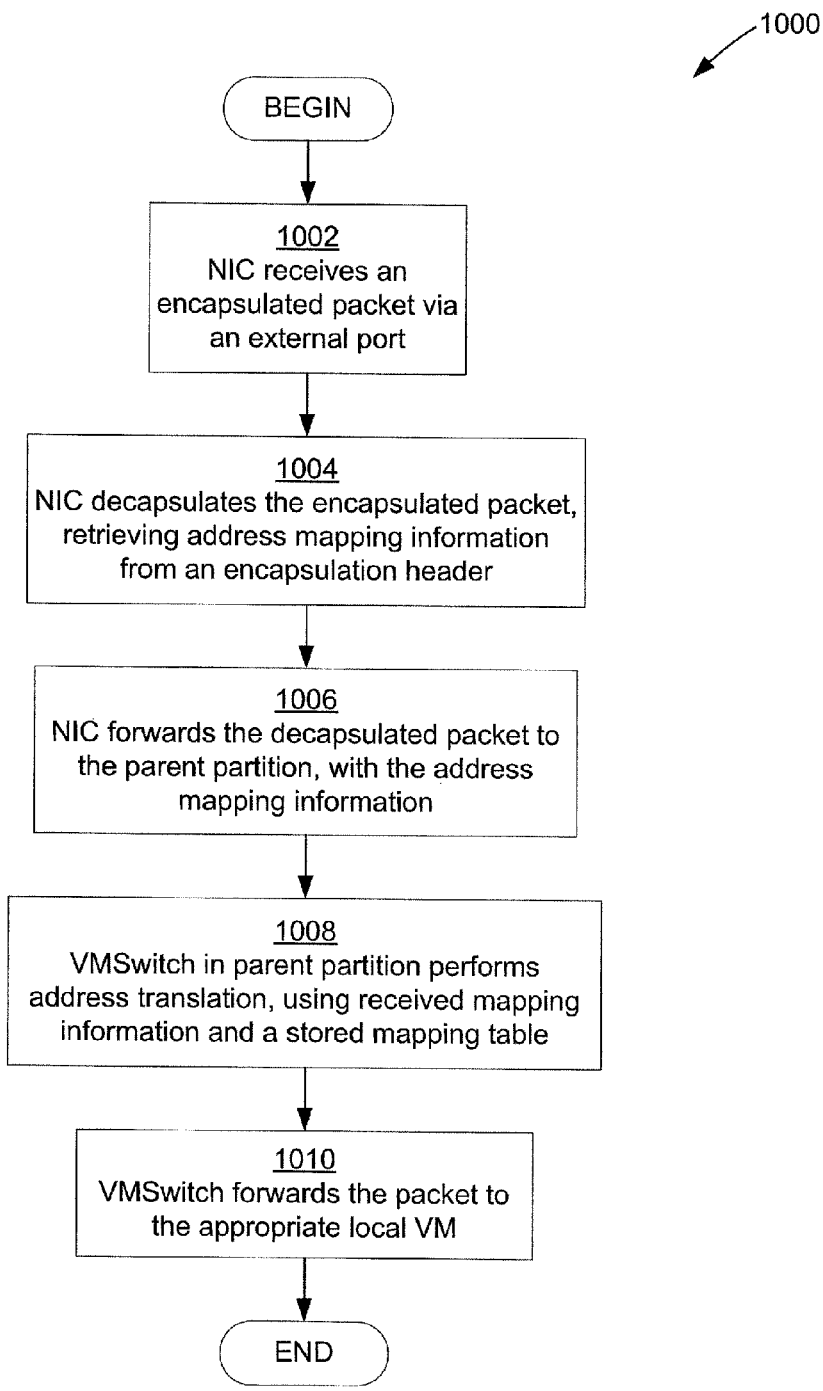
FIG. 10 is a flow chart of an embodiment of a method of receiving data in a host computing device operating a virtualized computing environment, in which the MC is adapted to perform encapsulation and communicates mapping information with the parent partition using out-of-band data.

FIG. 10 is a flow chart of a method 1000 of receiving a packet through a NIC which is enabled to perform encapsulation and decapsulation, and to supply mapping information to the parent partition for address translation. In act 1002, the NIC receives an encapsulated packet from an external network. This packet may have been encapsulated using any suitable protocol, such as GRE, and it is transmitted from any appropriate source, such as another host computing device.

In act 1004, the NIC may decapsulate the received encapsulated packet, obtaining a decapsulated packet and mapping information. The mapping information may be obtained, for example, from a field in the header that was used to encapsulate the packet. Regardless of the exact technique used to communicate this mapping information in the encapsulated packet, in act 1006 the NIC may forward this mapping information to the parent partition, along with the decapsulated packet. In some embodiments, the mapping information may be transmitted using a secure side channel, such as out-of-band data.

In act 1008, a virtual switch in the parent partition may receive the packet and the mapping information, and access stored information to determine an appropriate action for the packet. For example, the virtual switch may access a stored mapping table to determine a destination of the packet, using the received mapping information. The virtual switch may then forward the packet, in act 1010, to the appropriate destination VM.

Figure 11:
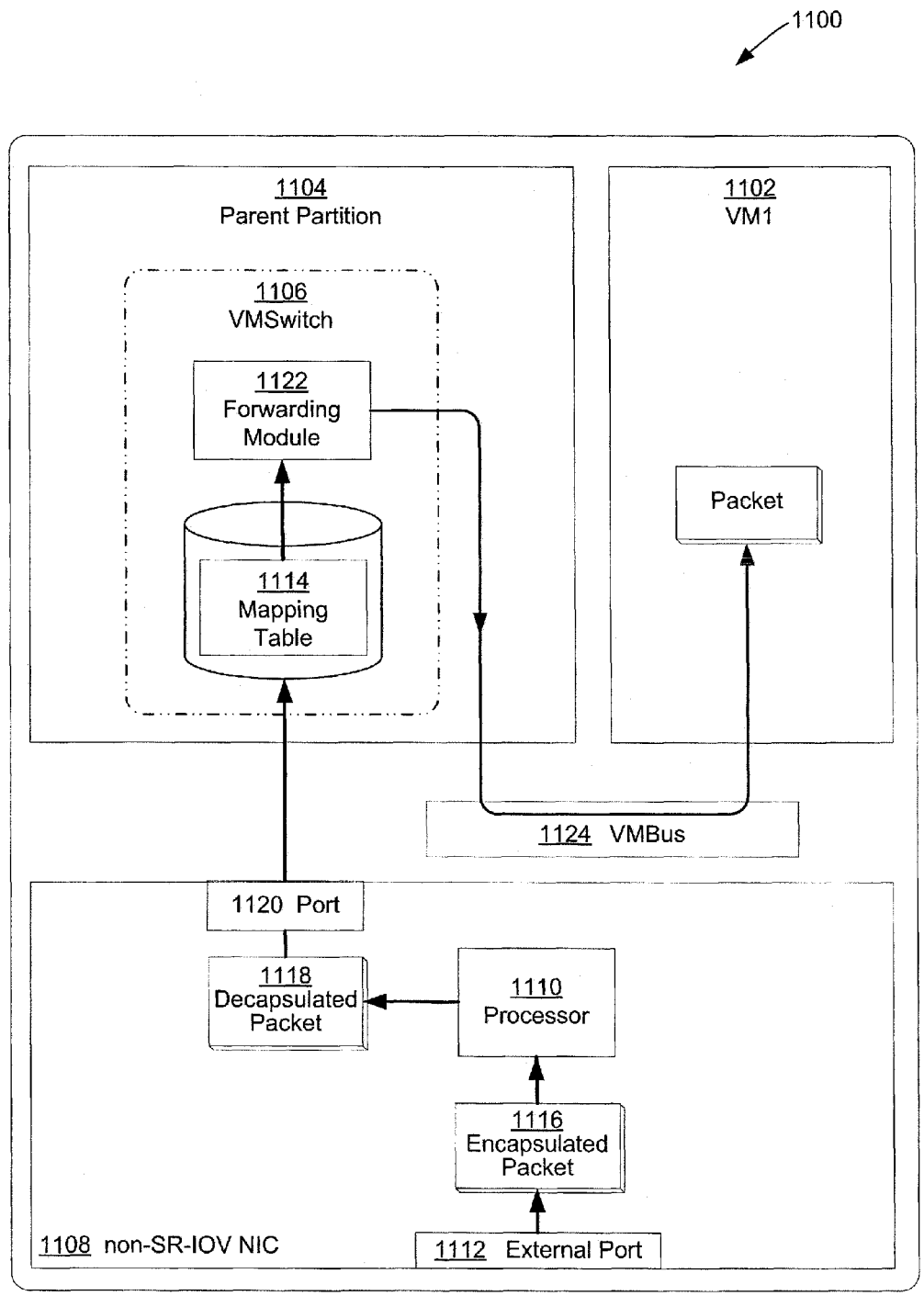
FIG. 11 is a schematic illustration of an embodiment of a receive path in a host computing device operating a virtualized computing environment, in which the NIC is adapted to perform encapsulation and communicates mapping information with the parent partition using out-of-band data.

FIG. 11 illustrates an example of a packet receive path in a host computing device 1100 that implements method 1000. The host computing device 1100 operates a virtualized computing environment comprising virtual machines, such as virtual machine 1102, and a parent partition 1104. The parent partition 1104 may have a virtual switch, such as VMSwitch 1106, that forward packets to and from the virtual machines, such as VM 1102.

The host computing device 1100 may have a physical interface, such as NIC 1108, to an external network. The NIC 1108 may have a processor 1110 that is enabled to encapsulate and decapsulate packets. The NIC 1108 may also have various communication ports, such as external port 1112 for communication with an external network.

The NIC processor 1110 may receive encapsulated packet 1116 via external port 1112. The NIC processor 1110 may decapsulate the received encapsulated packet to obtain an address mapping information and a decapsulated packet 1118. In some embodiments, the mapping information may be a tenant ID or Virtual Subnet ID that identifies a virtual network on which the destination VM resides. Alternatively or additionally, the NIC processor 1110 may decapsulate packets to obtain any appropriate network policy information.

The packet 1118 may be forwarded, via port 1120, to the parent partition 1104. The mapping information may also be transmitted to the parent partition 1104 using a secure side channel, such as out-of-band data. The VMSwitch 1106 in the parent partition 1104 may receive the packet and the mapping information and determine an appropriate destination for the packet.

In some embodiments, the VMSwitch 1106 may access stored information, such as a mapping table 1114, to perform address translation using the received mapping information. This address translation may be used, for example, to translate a customer address (CA) to a provider address (PA). Regardless of the exact nature of the processing performed on the packet, the packet may be forwarded by forwarding module 1122 to the determined destination VM. The packet may be transmitted from the parent partition 1104 to the VM 1102 using any appropriate transmission medium, such as a virtual bus 1124.

There may be various reasons and motivations for offloading the operations of encapsulation and decapsulation, but not the mapping data, to the NIC. In some scenarios, this may allow the NIC to consume less of its onboard memory to store a mapping table, while still allowing the NIC to relieve the parent partition from the tasks of encapsulation and decapsulation.

In some embodiments, alternatively or additionally to the NIC sending packets to the parent partition for address translation, the mapping information may be provided to the virtual machines in an encrypted format. The virtual machines may not have the ability to decrypt the mapping information. Instead, the virtual machines may provide this encrypted mapping information to the NIC along with the packet that is being transmitted. The NIC may decrypt the encrypted mapping information and route the packet to the appropriate destination.

The VMs may only know of, and use, encrypted versions of the provider address (PA) of their own interface or the interfaces of other machines and devices. Before transmitting a packet to a remote CA for the first time, a VM may request the parent partition to map the CA to an encrypted PA. It is also possible for the parent partition to anticipate that a VM might need this mapping and provide the encrypted PA unsolicited.

Figure 12:
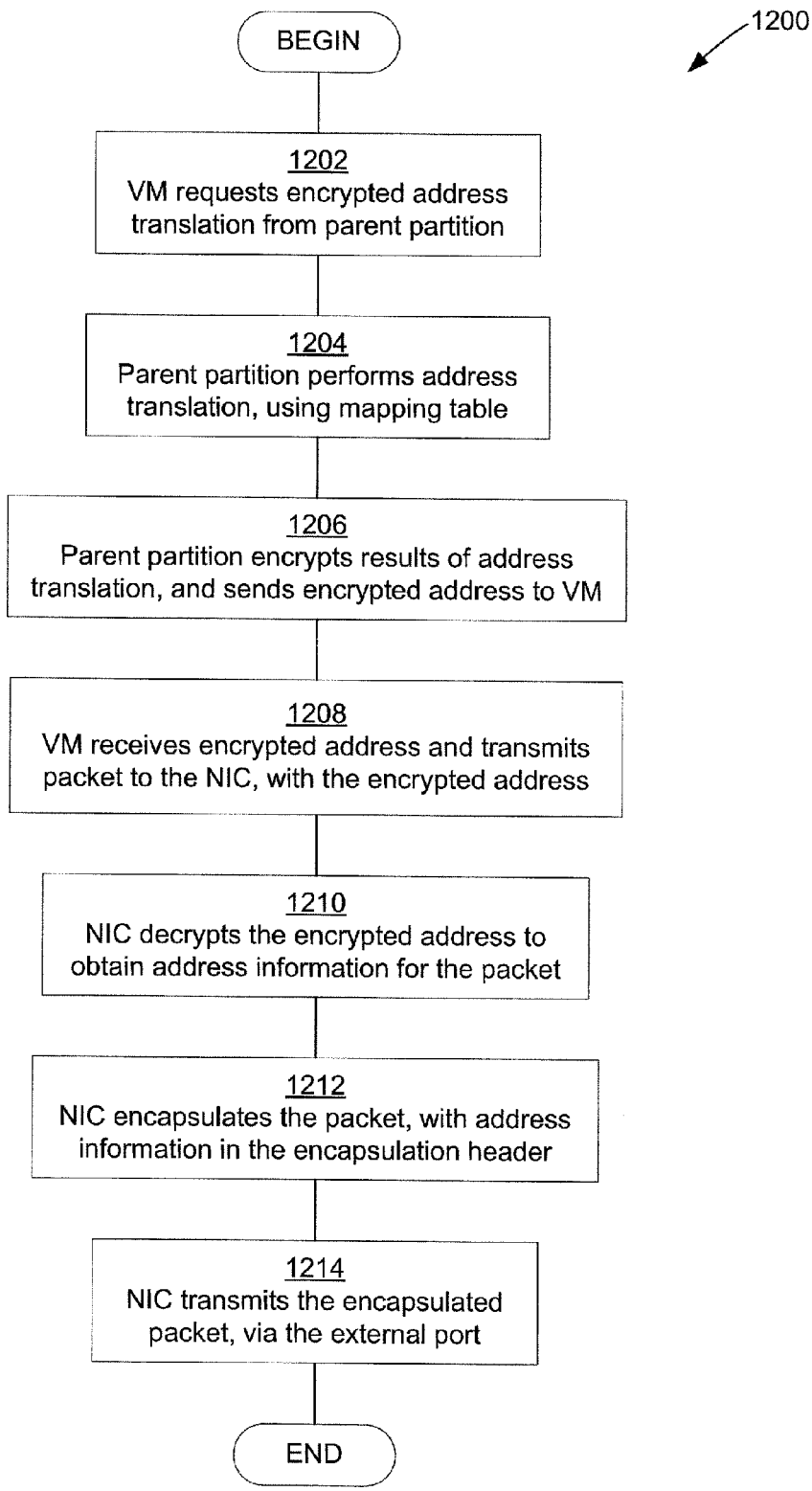
FIG. 12 is a flow chart of an embodiment of a method of transmitting data in a host computing device operating a virtualized computing environment, in which the NIC is adapted to perform encapsulation and communicates encrypted mapping information with a virtual machine using out-of-band data.

FIG. 12 is a flow chart of a method 1200 for providing encrypted mapping information to VMs for secure offloading of encapsulation and decapsulation to the NIC, without offloading mapping information. In act 1202, a VM may request encrypted address information from the parent partition. In some embodiments, the VM may send a customer address (CA) for which associated provider address (PA) is to be determined. In act 1204, the parent partition may use the received CA to determine a corresponding PA, using a stored mapping table.

In act 1206, the parent partition may encrypt the results of this address translation, using any appropriate encryption algorithm. In some embodiments, the encryption may involve a key, which may be a private or shared key. Regardless of the exact nature of encryption, the parent partition may send the encrypted PA to the VM.

In act 1208, the VM receives the encrypted PA and transmits it, along with the packet, to the MC. The encrypted PA may be sent, for example, using a secure side channel, such as out-of-band data. In some embodiments, the VM may not be able to decrypt the encrypted PA. This may allow the physical address space to remain protected from VMs, and prevent possible unsupervised and/or malicious use of the physical network.

In act 1210, the NIC may receive the encrypted PA and perform decryption to obtain address information for the packet. In some embodiments, the NIC may have a key to decrypt the encrypted PA. Regardless of the exact nature of decryption, the NIC may obtain access to the PA that was determined by the parent partition. Regardless of the exact nature of the address information that was decrypted, in act 1212, the NIC may use this address information to encapsulate the packet for transmission over the external network in act 1214. For example, the NIC may determine a tenant ID or Virtual Subnet ID to store in a GRE header that encapsulates the packet.

Figure 13:
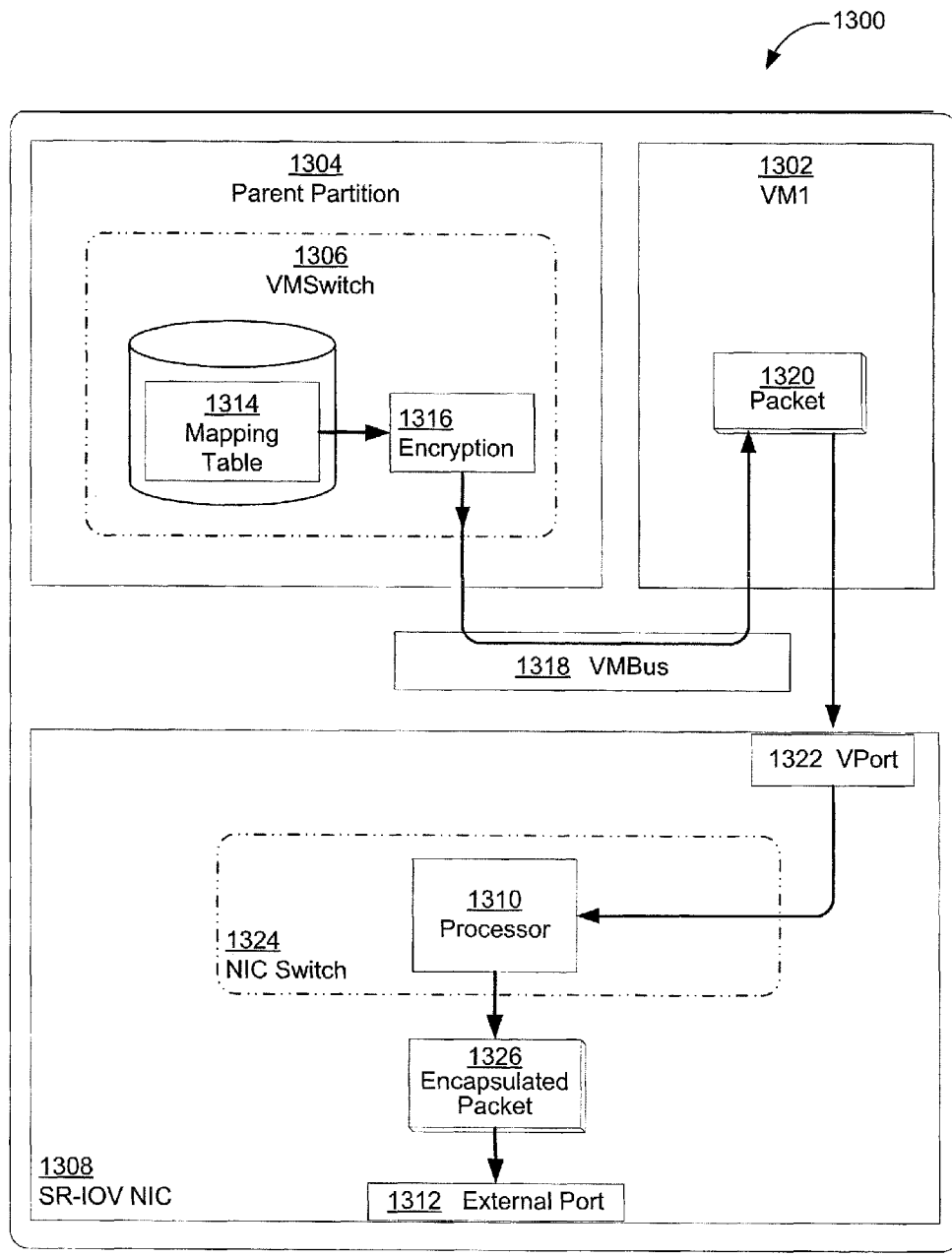
FIG. 13 is a schematic illustration of an embodiment of a transmit path in a host computing device operating a virtualized computing environment, in which the NIC is adapted to perform encapsulation and communicates encrypted mapping information with a virtual machine using out-of-band data.

FIG. 13 illustrates an example of a packet transmission path in a host computing device 1300 that implements method 1200. The host device 1300 operates a virtualized computing environment comprising virtual machines, such as virtual machine 1302, and a parent partition 1304. The parent partition 1304 may have a virtual switch, such as VMSwitch 1306, that determines addressing information for packets communicated to and from the VM 1302. The host computing device 1300 may have a NIC 1306 that is enabled to communicate directly with VM 1302.

The parent partition may program the virtual ports, such as virtual port 1322, of the NIC with a unique key (VPort$_{Key}$) through a software driver, such as a physical function (PF) driver. This VPort key may be used to decrypt the encrypted mapping information sent by the parent partition. The virtual port may also be programmed with the appropriate tenant ID or Virtual Subnet ID of the VM. In some embodiments, the VM 1302 may not know, and cannot access, the VPort key or the tenant ID or Virtual Subnet ID.

When VM 1302 needs an address mapping from a CA to a PA, it may submit a request to the parent partition 1304. Alternatively or additionally, the VM 1302 may have a local lookup table of encrypted PAs that may be populated by requesting encrypted PAs from the parent partition 1304. Encrypted PAs may be stored in any suitable memory location of the virtual machine 1302. For example, encrypted PAs may be stored in the NetVSC driver or the Address Resolution Protocol (ARP) table of the virtual machine 1302.

Regardless of how the VM 1302 obtains encrypted PAs, the parent partition 1304 may perform an encryption operation on a PA. The parent partition 1304 may access the PA from mapping table 1314 and, in some embodiments, concatenate a unique (per CA) "salt" value to the PA. This salt value, CA$_{Salt}$, may be, for example, a string of bits that is used to create a unique encrypted address for every VM, even those with the same PA. In general, however, any suitable technique may be used to generate unique encrypted PAs. For example, embodiments may use techniques to generate unique PAs, for example, by using a one-to-one address mapping.

Regardless of the exact nature of generating PAs and encrypting PAs, PAs may be encrypted such that VMs co-located in the same host have different encrypted PAs. In some embodiments, an encryption module 1316 in the parent partition 1304 may calculate an encrypted PA (PA$_{En}$) using a combination of the PA, CA$_{Salt}$ and VPort$_{Key}$ values. This value and CA$_{Salt}$ may then be returned to the VM 1302 via virtual bus 1318.

When transmitting packets, VM 1302 provides the encrypted PA (PA$_{En}$) and salt value (CA$_{Salt}$) via a secure channel, such as an out-of-band (OOB) data. The NIC Switch 1324 receives these values via virtual port 1322, and calculates the PA using the encrypted PA, the salt value and the VPort key. The NIC 1308 then encapsulates the packet using the tenant ID or Virtual Subnet ID of the virtual port, and transmits the encapsulated packet 1326 via the external port 1312.

When a GRE-encapsulated packet is received by an SR-IOV NIC, a tenant ID or Virtual Subnet ID is extracted from the GRE header. The destination virtual port is determined by the destination MAC address specified in the inner header of the packet. The tenant ID or Virtual Subnet ID extracted from the GRE header is then compared against the tenant ID or Virtual Subnet ID of the virtual port. If these two values match, the packet is delivered to the VM through the virtual function. If these values do not match, the packet is delivered to the parent partition for address mapping.

Although the examples in the foregoing figures and description primarily focused on offloading GRE encapsulation, the basic principles and approaches described may also be applied to offloading Access Control List (ACL), Network Address Translation (NAT) and any other suitable operation that would otherwise have been performed by the parent partition, and can instead be performed by hardware in the NIC. It will be understood that the invention is not limited to GRE encapsulation and that any other encapsulation technique can be utilized.

Figure 14:
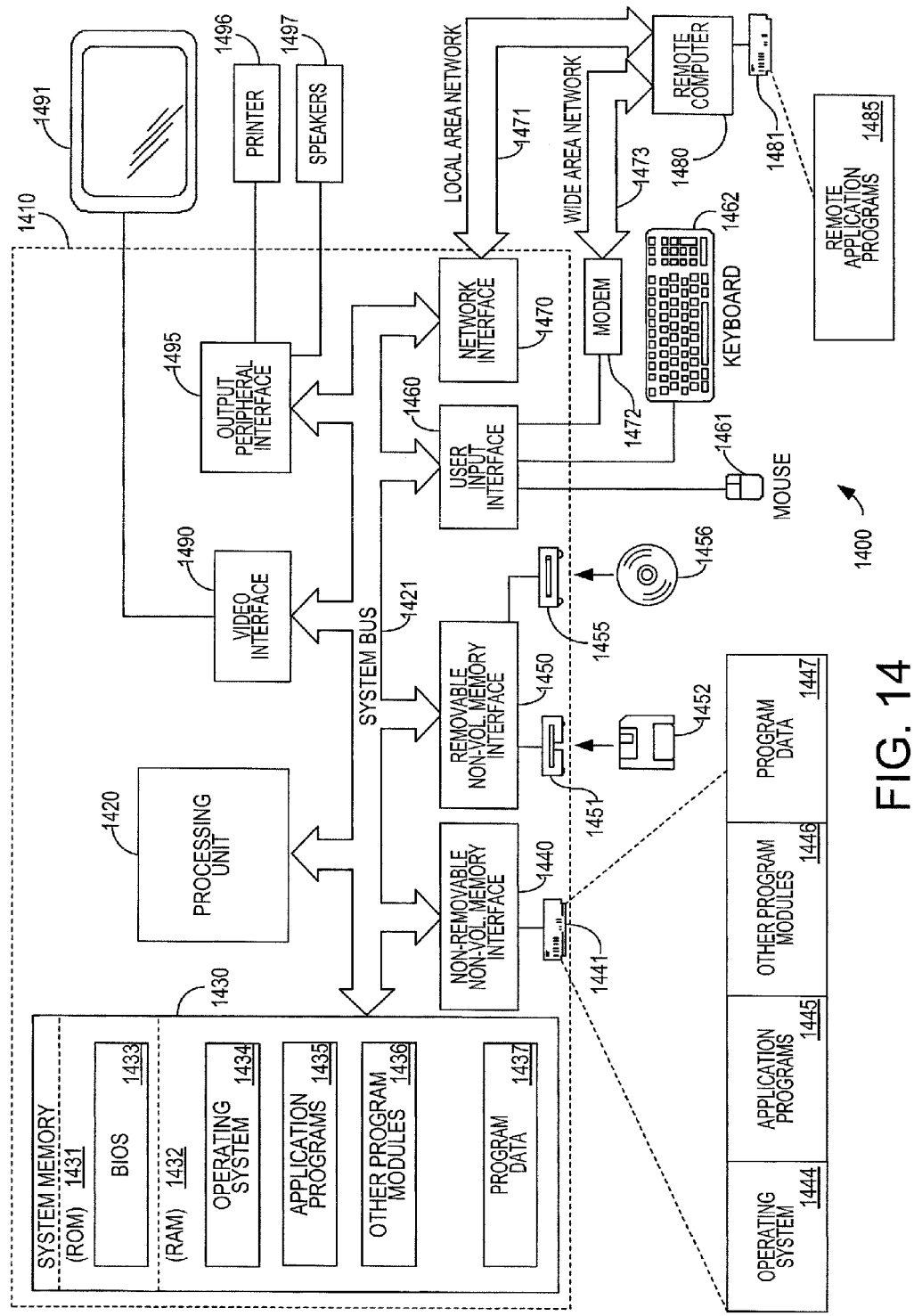
FIG. 14 is a schematic illustration of a representative computing device on which embodiments of the invention may operate.

FIG. 14 illustrates an example of a suitable computing system environment 1400 on which various embodiments may be implemented. Computing system 1400 may represent, for example, a host computing device. The computing system environment 1400 is only one example of a suitable computing environment and is not intended to suggest any limitation as to the scope of use or functionality of the invention. Neither should the computing environment 1400 be interpreted as having any dependency or requirement relating to any one or combination of components illustrated in the exemplary operating environment 1400.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 14, an exemplary system for implementing the invention includes a general purpose computing device in the form of a computer 1410. Components of computer 1410 may include, but are not limited to, a processing unit 1420, a system memory 1430, and a system bus 1421 that couples various system components including the system memory to the processing unit 1420. The system bus 1421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1410 typically includes a variety of computer readable media. Computer readable media can be any available media that can be accessed by computer 1410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1430 includes computer storage media in the form of volatile and/or nonvolatile memory such as read only memory (ROM) 1431 and random access memory (RAM) 1432. A basic input/output system 1433 (BIOS), containing the basic routines that help to transfer information between elements within computer 1410, such as during start-up, is typically stored in ROM 1431. RAM 1032 typically contains data and/or program modules that are immediately accessible to and/or presently being operated on by processing unit 1420. By way of example, and not limitation, FIG. 14 illustrates operating system 1434, application programs 1435, other program modules 1436, and program data 1437.

The computer 1410 may also include other removable/non-removable, volatile/nonvolatile computer storage media. By way of example only, FIG. 14 illustrates a hard disk drive 1441 that reads from or writes to non-removable, nonvolatile magnetic media, a magnetic disk drive 1451 that reads from or writes to a removable, nonvolatile magnetic disk 1452, and an optical disk drive 1455 that reads from or writes to a removable, nonvolatile optical disk 1456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1441 is typically connected to the system bus 1421 through an non-removable memory interface such as interface 1440, and magnetic disk drive 1451 and optical disk drive 1455 are typically connected to the system bus 1421 by a removable memory interface, such as interface 1450.

The drives and their associated computer storage media discussed above and illustrated in FIG. 14, provide storage of computer readable instructions, data structures, program modules and other data for the computer 1410. In FIG. 14, for example, hard disk drive 1441 is illustrated as storing operating system 1444, application programs 1445, other program modules 1446, and program data 1447. Note that these components can either be the same as or different from operating system 1434, application programs 1435, other program modules 1436, and program data 1437. Operating system 1444, application programs 1445, other program modules 1446, and program data 1447 are given different numbers here to illustrate that, at a minimum, they are different copies. A user may enter commands and information into the computer 1410 through input devices such as a keyboard 1462 and pointing device 1461, commonly referred to as a mouse, trackball or touch pad. Other input devices (not shown) may include a microphone, joystick, game pad, satellite dish, scanner, or the like. These and other input devices are often connected to the processing unit 1420 through a user input interface 1460 that is coupled to the system bus, but may be connected by other interface and bus structures, such as a parallel port, game port or a universal serial bus (USB). A monitor 1491 or other type of display device is also connected to the system bus 1421 via an interface, such as a video interface 1490. In addition to the monitor, computers may also include other peripheral output devices such as speakers 1497 and printer 1496, which may be connected through a output peripheral interface 1495.

The computer 1410 may operate in a networked environment using logical connections to one or more remote computers, such as a remote computer 1480. The remote computer 1480 may be a personal computer, a server, a router, a network PC, a peer device or other common network node, and typically includes many or all of the elements described above relative to the computer 1410, although only a memory storage device 1481 has been illustrated in FIG. 14. The logical connections depicted in FIG. 14 include a local area network (LAN) 1471 and a wide area network (WAN) 1473, but may also include other networks. Such networking environments are commonplace in offices, enterprise-wide computer networks, intranets and the Internet.

When used in a LAN networking environment, the computer 1410 is connected to the LAN 1471 through a network interface or adapter 1470. Such a network interface 1470 may represent the network interface controller (NIC) according to some embodiments. When used in a WAN networking environment, the computer 1410 typically includes a modem 1472 or other means for establishing communications over the WAN 1473, such as the Internet. The modem 1472, which may be internal or external, may be connected to the system bus 1421 via the user input interface 1460, or other appropriate mechanism. In a networked environment, program modules depicted relative to the computer 1410, or portions thereof, may be stored in the remote memory storage device. By way of example, and not limitation, FIG. 14 illustrates remote application programs 1485 as residing on memory device 1481. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A network interface controller adapted for use as part of a computing device operating a virtualized computing environment comprising a parent partition and at least one virtual machine, the network interface controller comprising:
 a processor; and
 a memory having a data structure and program instructions stored thereon, the program instructions adapted for forwarding a received packet such that, upon execution by the processor, the program instructions cause the network interface controller to:
  decrypt address information associated with the packet using a first key, wherein the first key is part of a key pair with a second key accessible by the parent partition;
  determine, based at least in part on the address information, whether mapping information to forward the packet to a destination is present in the data structure; and
  at least one of:
   if the mapping information is present in the data structure, use the mapping information to send the packet to the destination; or
   if the mapping information is not present in the data structure, send the packet to the parent partition.

2. The network interface controller of claim 1, wherein the data structure contains a mapping table, the mapping table associating the address information with an address of the destination.

3. The network interface controller of claim 2, wherein the address information identifies a virtual network that includes at least one other virtual machine.

4. The network interface controller of claim 1, wherein the data structure contains a security policy, the security policy indicating a level of authorization assigned to the packet.

5. The network interface controller of claim 1, wherein decrypting the address information comprises obtaining the address information from a header.

6. The network interface controller of claim 1, wherein sending the packet comprises encapsulating the packet to insert into a header information based on the mapping information.

7. The network interface controller of claim 1, wherein sending the packet to the destination comprises sending the packet directly to the virtual machine.

8. The network interface controller of claim 1, wherein the received packet is received directly from the virtual machine.

9. The network interface controller of claim 1, wherein the data structure contains mapping information that represents frequently-used connections between virtual machines.

10. The network interface controller of claim 1, wherein sending the packet comprises performing address rewrite for the packet.

11. The network interface controller of claim 1, wherein at least part of the data structure is populated with information received from the parent partition.

12. A network interface controller adapted for use as part of a computing device operating a virtualized computing environment comprising a parent partition and at least one virtual machine, the network interface controller comprising:
 a processor; and
 at least one computer storage medium containing instructions that, upon execution by the processor, cause the network interface controller to:
  receive from the at least one virtual machine a packet and encrypted address information;
  decrypt the encrypted address information using a first key, wherein the first key is part of a key pair with a second key accessible by the parent partition;
  encapsulate the packet by inserting the decrypted address information into a header of the packet; and
  send the encapsulated packet to an external network.

13. A method of operating a computing device to implement a virtualized computing environment comprising a parent partition and at least one virtual machine, the method comprising:
 the virtual machine requesting address information from the parent partition;
 the parent partition encrypting the requested address information;
 the parent partition sending the encrypted address information to the virtual machine; and
 the virtual machine sending a packet with the encrypted address information to a network interface controller of the computing device.

14. The method of claim 13, wherein the virtual machine stores the encrypted address information in a memory store.

15. The method of claim 13, wherein encrypting the address information comprises: using a first key, wherein the first key is part of a key pair with a second key accessible by the network interface controller, to encrypt the address information.

16. The method of claim 15, wherein encrypting the address information further comprises: using a random value that is independent of the address information and the first and second keys.

17. A method of operating a computing device to implement a virtualized computing environment comprising a parent partition and at least one virtual machine, the method comprising:
 the virtual machine determining mapping information that satisfies a criteria relating to a number of connections established by the network interface controller, wherein the connections are associated with the mapping information;
 the virtual machine requesting the parent partition to send to a network interface controller the mapping information that satisfies the criteria; and
 the parent partition sending the requested mapping information to the network interface controller.

18. The method of claim 17, further comprising polling, at predetermined times, the network interface controller to identify the most active connections.

19. The method of claim 18, further comprising, when the number of connections drops below a threshold value, removing the mapping information from the network interface controller.

20. The method of claim 17, wherein the mapping information relates to address translation for virtual networking.

21. The method of claim 17, wherein the mapping information relates to a security policy, the security policy indicating a level of authorization assigned to packets.

22. A method of operating a computing device to implement a virtualized computing environment comprising a parent partition and at least one virtual machine, the method comprising:
- the virtual machine determining mapping information that satisfies a criteria;
- the virtual machine requesting the parent partition to send to a network interface controller the mapping information that satisfies the criteria;
- the parent partition sending the requested mapping information to the network interface controller; and
- polling, at predetermined times, the network interface controller to identify the most active connections.

23. The method of claim 22, further comprising, when the number of connections drops below a threshold value, removing the mapping information from the network interface controller.

* * * * *